(12) United States Patent
Chai et al.

(10) Patent No.: US 10,448,269 B2
(45) Date of Patent: Oct. 15, 2019

(54) MEASUREMENT METHOD, CELL MEASUREMENT METHOD, APPARATUS, AND COMMUNICATIONS NODE

(71) Applicant: Huawei Technologies Co., Ltd., Shenzhen, Guangdong (CN)

(72) Inventors: Li Chai, Beijing (CN); Jie Shi, Beijing (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 260 days.

(21) Appl. No.: 14/803,883

(22) Filed: Jul. 20, 2015

(65) Prior Publication Data

US 2015/0327097 A1 Nov. 12, 2015

Related U.S. Application Data

(63) Continuation of application No. PCT/CN2013/070730, filed on Jan. 18, 2013.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC .............................. H04W 24/08; H04W 24/10
See application file for complete search history.

(56) References Cited

U.S. PATENT DOCUMENTS

2010/0278221 A1 11/2010 Qi et al.
2012/0083278 A1* 4/2012 Kazmi ................. H04W 36/06
455/440
(Continued)

FOREIGN PATENT DOCUMENTS

CN 102387528 A 3/2012
CN 102457890 A 5/2012
(Continued)

OTHER PUBLICATIONS

"3rd Generation Partnership Project; Technical Specification Group Radio Access Network; Evolved Universal Terrestrial Radio Access (E-UTRA); Requirements for support of radio resource management (Release 11)", 3GPP TS 36.133 V11.3.1, Jan. 2013, 88 pages.
(Continued)

*Primary Examiner* — Pao Sinkantarakorn
*Assistant Examiner* — Kabir U Jahangir
(74) *Attorney, Agent, or Firm* — Slater Matsil, LLP

(57) ABSTRACT

A measurement method, a cell measurement method, an apparatus, and a communications node are disclosed. A first communications node sends measurement information to a second communications node, where the measurement information includes measurement signal configuration information and/or configuration information of a measurement signal combination, the two pieces of configuration information are respectively used by the second communications node to determine a resource of a measurement signal corresponding to the measurement signal configuration information and a resource of a measurement signal corresponding to the configuration information of the measurement signal combination; and the first communications node receives a measurement report sent by the second communications node, where the measurement report carries a measurement result of measurement performed by the (Continued)

A first communications node sends measurement information to a second communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination — 101

The first communications node receives a measurement report sent by the second communications node, where the measurement report carries a measurement result of measurement performed by the second communications node according to the measurement information — 102 second communications node according to the measurement information. The examples of the present invention implement measurement on a radio link after introduction of a non-backward-compatible cell or carrier.

16 Claims, 9 Drawing Sheets

(56) References Cited

U.S. PATENT DOCUMENTS

| | | | |
|---|---|---|---|
| 2012/0213109 A1* | 8/2012 | Xu | H04B 7/024 370/252 |
| 2013/0267221 A1* | 10/2013 | Srinivasan | H04W 36/0088 455/422.1 |
| 2013/0279357 A1 | 10/2013 | Gao | |
| 2013/0286884 A1* | 10/2013 | Li | H04L 1/0026 370/252 |
| 2013/0286964 A1* | 10/2013 | Chu | H04L 27/261 370/329 |
| 2013/0301465 A1* | 11/2013 | Seo | H04B 7/0626 370/252 |
| 2014/0119228 A1 | 5/2014 | Wang et al. | |
| 2015/0124726 A1 | 5/2015 | Ni et al. | |
| 2015/0249511 A1* | 9/2015 | Chen | H04L 1/0026 370/252 |

FOREIGN PATENT DOCUMENTS

| | | |
|---|---|---|
| CN | 102546113 A | 7/2012 |
| CN | 102684835 A | 9/2012 |
| CN | 102869105 A | 1/2013 |
| EP | 2369775 A2 | 9/2011 |
| RU | 2458470 C2 | 8/2012 |
| WO | 2011/153286 A1 | 12/2011 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0, Dec. 2012, 208 pages.

"3rd Generation Partnership Project; Technical Specification Group Radio Access Network; Evolved Universal Terrestrial Radio Access (E-UTRA); Physical layer procedures (Release 11)", 3GPP TS 36.213 V11.1.0, Dec. 2012, 160 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.

"CRS subframe configuration for unsynchronised new carriers", New Postcom, 3GPP TSG RAN WG1 Meeting #71, Nov. 12-16, 2012, 3 pages, R1-124948.

"CSI-RS based RRM measurement for synchronised new carriers", New Postcom, 3GPP TSG RAN WG1 Meeting #71, Nov. 12-16, 2012, 4 pages, R1-124949.

"RRM measurement in new carrier type", Pantech, 3GPP TSG RAN1 #71, Nov. 12-16, 2012, 3 pages, R1-125037.

MediaTek Inc.; "Discussion on Reduced CRS Bandwidth for NCT"; 3GPP TSG-RAN WG1 Meeting #71; R1-124941; New Orleans, USA; Nov. 12-16, 2012; 3 pages.

Pantech; "On PSS/SSS Details for NCT"; 3GPP TSG RAN1 #71; R1-125035; New Orleans, USA; Nov. 12-16, 2012; 4 pages.

* cited by examiner

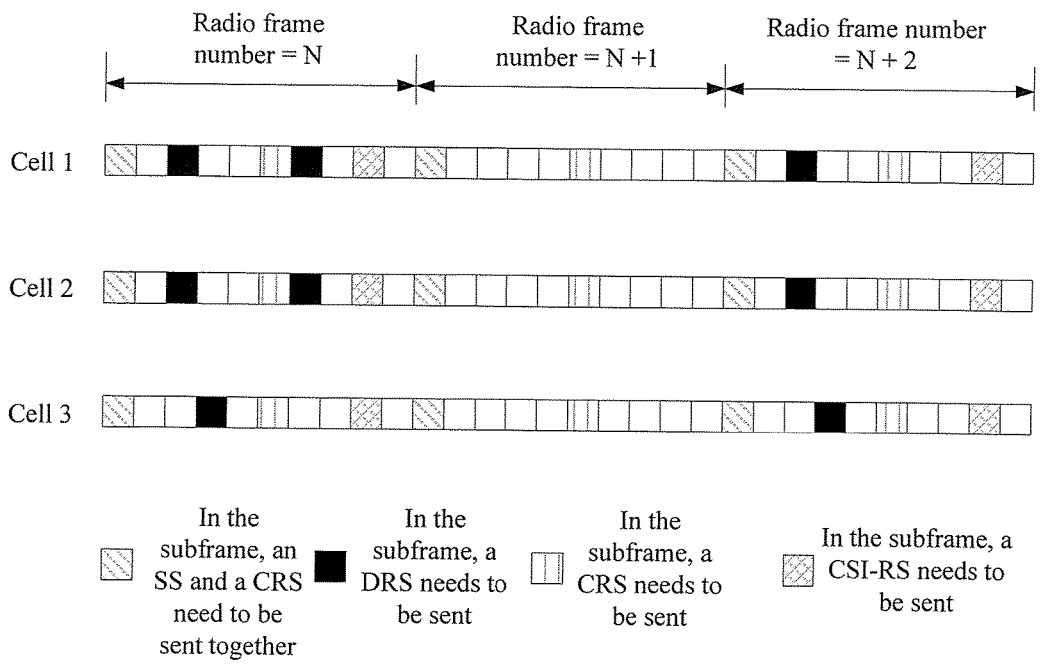

FIG. 5B

A second communications node receives discovery reference signal DRS signaling sent by a first communications node, where the signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets — 601

The second communications node discovers and/or measures the first communications node by using the signaling — 602

MEASUREMENT METHOD, CELL MEASUREMENT METHOD, APPARATUS, AND COMMUNICATIONS NODE

CROSS-REFERENCE TO RELATED APPLICATIONS

This application is a continuation of International Application No. PCT/CN2013/070730, filed on Jan. 18, 2013, which is hereby incorporated by reference in its entirety.

TECHNICAL FIELD

The present invention relates to the field of communications technologies, and in particular, to a measurement method, a cell measurement method, an apparatus, and a communications node.

BACKGROUND

In the field of communications, to perform mobility management on a user equipment (UE), a radio link needs to be measured, so as to evaluate, according to a measurement result, quality of a signal received from a cell by the UE. At present, reference signaling for measurement mainly includes a cell-specific reference signal (CRS) and a channel state information reference signal (CSI-RS).

In an existing measurement manner, a network side delivers measurement control information to a UE to regulate a measurement behavior and a measurement reporting criterion of a user; the UE measures a neighboring cell of an access cell, and reports, to the network side, a measurement result conforming to the reporting criterion in a form of a measurement report, where the measurement report includes an identity of a cell conforming to the reporting criterion. The network side performs mobility management (for example, a handover decision) on the UE according to the measurement result reported by the UE. In an existing measurement manner, reference signaling (a CRS or a CSI-RS) highly corresponds to a measurement type, and the network side does not constrain the measurement behavior of the UE excessively. However, with the development of communications technologies, after a non-backward-compatible cell or carrier such as a new carrier type (NCT) cell or carrier is introduced, the existing measurement manner is no longer applicable.

SUMMARY

Embodiments of the present invention provide a measurement method, a cell measurement method, an apparatus, and a communications node, so as to implement measurement of a radio link after a non-backward-compatible cell or carrier is introduced.

To solve the foregoing technical problem, the embodiments of the present invention disclose the following technical solutions:

A first aspect provides a measurement method, where the method includes:

sending, by a first communications node, measurement information to a second communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination; and receiving, by the first communications node, a measurement report sent by the second communications node, where the measurement report carries a measurement result of measurement performed by the second communications node according to the measurement information.

In a first possible implementation manner of the first aspect, where:

the measurement signal is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

With reference to the first aspect or the first possible implementation manner of the first aspect, in a second possible implementation manner, the measurement signal configuration information includes at least one of the following:

frequency domain resource configuration information, code domain resource configuration information, subframe configuration information, space domain information, and pattern information on a unit resource.

With reference to the first aspect, or the first or the second possible implementation manner of the first aspect, in a third possible implementation manner, the measurement signal configuration information includes configuration information of a DRS.

With reference to the first aspect, or the first or the second or the third possible implementation manner of the first aspect, in a fourth possible implementation manner, the measurement information further includes: a mapping relationship between the configuration information of the DRS and a CSI-RS.

With reference to the first aspect, or the first or the second or the third or the fourth possible implementation manner of the first aspect, in a fifth possible implementation manner, the configuration information of the DRS includes at least one of the following:

antenna port information, frequency domain resource configuration information, code domain resource configuration information, subframe configuration information, pattern information on a unit resource, and a ratio of transmit power of a physical downlink shared channel (PDSCH) to that of the DRS.

With reference to the first aspect, or the first or the second or the third or the fourth or the fifth possible implementation manner of the first aspect, in a sixth possible implementation manner, the subframe configuration information includes: subframe shift information and period information.

With reference to the first aspect, or the first or the second or the third or the fourth or the fifth or the sixth possible implementation manner of the first aspect, in a seventh possible implementation manner, the configuration information of the DRS further includes: synchronization information, where the synchronization information includes at least one of the following: a radio frame number shift, a subframe shift, and a time symbol shift.

With reference to the first aspect, or the first or the second or the third or the fourth or the fifth or the sixth or the seventh possible implementation manner of the first aspect, in an eighth possible implementation manner, the measurement signal configuration information includes: configuration information of a CRS sent in a partial subframe, where the configuration information of the CRS sent in the partial subframe includes at least one of the following:

frequency domain resource configuration information, subframe configuration information, and pattern information on a unit resource, where the subframe configuration information includes: subframe shift information and period information.

With reference to the first aspect, or the first or the second or the third or the fourth or the fifth or the sixth or the seventh or the eighth possible implementation manner of the first aspect, in a ninth possible implementation manner, the measurement information further includes: a neighboring cell identity or identity information of a third communications node, where the third communications node is adjacent to the first communications node.

With reference to the first aspect, or the first or the second or the third or the fourth or the fifth or the sixth or the seventh or the eighth or the ninth possible implementation manner of the first aspect, in a tenth possible implementation manner, the measurement information further includes: a measurement signal type.

With reference to the first aspect, or the first or the second or the third or the fourth or the fifth or the sixth or the seventh or the eighth or the ninth or the tenth possible implementation manner of the first aspect, in an eleventh possible implementation manner, the measurement signal type includes at least one of the following:

CRS whole-set measurement, CRS restricted measurement, CSI-RS measurement, DRS measurement, CRS and DRS hybrid measurement, CSI-RS and DRS hybrid measurement, CRS and CSI-RS hybrid measurement, and DRS, CRS and, CSI-RS hybrid measurement.

With reference to the first aspect, or the first or the second or the third or the fourth or the fifth or the sixth or the seventh or the eighth or the ninth or the tenth or the eleventh possible implementation manner of the first aspect, in a twelfth possible implementation manner, the measurement information further includes: measurement type configuration information.

With reference to the first aspect, or the first or the second or the third or the fourth or the fifth or the sixth or the seventh or the eighth or the ninth or the tenth or the eleventh or the twelfth possible implementation manner of the first aspect, in a thirteenth possible implementation manner, if the measurement report carries a measurement result, corresponding to a DRS resource, of measurement performed by using a DRS, and after the first communications node receives the measurement report sent by the second communications node, the method further includes: sending configuration information of a CRS and/or configuration information of a CSI-RS to the second communications node.

With reference to the first aspect, or the first or the second or the third or the fourth or the fifth or the sixth or the seventh or the eighth or the ninth or the tenth or the eleventh or the twelfth or the thirteenth possible implementation manner of the first aspect, in a fourteenth possible implementation manner, the measurement information further includes: report configuration information, used to indicate a manner of sending the measurement report by the second communications node.

With reference to the first aspect, or the first or the second or the third or the fourth or the fifth or the sixth or the seventh or the eighth or the ninth or the tenth or the eleventh or the twelfth or the thirteenth or the fourteenth possible implementation manner of the first aspect, in a fifteenth possible implementation manner, the report configuration information further includes:

a period value of reporting the measurement result by the second communications node from a bottom layer to a higher layer; or a quantity value of measurement signals in the measurement result reported by the second communications node from a bottom layer to a higher layer.

With reference to the first aspect, or the first or the second or the third or the fourth or the fifth or the sixth or the seventh or the eighth or the ninth or the tenth or the eleventh or the twelfth or the thirteenth or the fourteenth or the fifteenth possible implementation manner of the first aspect, in a sixteenth possible implementation manner, the report configuration information includes a period value of reporting measurement by the second communications from the bottom layer to the higher layer.

With reference to the first aspect, or the first or the second or the third or the fourth or the fifth or the sixth or the seventh or the eighth or the ninth or the tenth or the eleventh or the twelfth or the thirteenth or the fourteenth or the fifteenth or the sixteenth possible implementation manner of the first aspect, in a seventeenth possible implementation manner, the measurement signal configuration information further includes at least one set of configuration information of a GAP, where:

the configuration information of the GAP includes: a period of starting the GAP, an initial position, and length of one or more GAPs; or the configuration information of the GAP includes pattern information of GAP configuration; or the configuration information of the GAP includes a quantity value of measurement signals to be measured.

With reference to the first aspect, or the first or the second or the third or the fourth or the fifth or the sixth or the seventh or the eighth or the ninth or the tenth or the eleventh or the twelfth or the thirteenth or the fourteenth or the fifteenth or the sixteenth or the seventeenth possible implementation manner of the first aspect, in an eighteenth possible implementation manner, the GAP configuration information further includes at least one of the following: a measurement signal type corresponding to each set of configuration information of the GAP, and frequency and/or system information corresponding to each set of configuration information of the GAP.

With reference to the first aspect, or the first or the second or the third or the fourth or the fifth or the sixth or the seventh or the eighth or the ninth or the tenth or the eleventh or the twelfth or the thirteenth or the fourteenth or the fifteenth or the sixteenth or the seventeenth or the eighteenth possible implementation manner of the first aspect, in a nineteenth possible implementation manner, the method further includes: obtaining, by the first communications node through an X2 interface, a radio interface between two base stations, or OAM, configuration information used for obtaining measurement information of a neighboring cell.

A second aspect provides a measurement method, where the method includes:

receiving, by a second communications node, measurement information sent by a first communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination;

determining, by the second communications node according to the measurement signal configuration information in the measurement information, the measurement signal resource corresponding to the measurement signal configuration information, and/or determining, according to the configuration information of the measurement signal combination in the measurement information, the measurement signal resource corresponding to the configuration information of the measurement signal combination; and measuring the measurement signal corresponding to the resource to obtain a measurement result; and sending, by the second communications node, the measurement result to the first communications node.

In a first possible implementation manner of the second aspect, the measurement signal is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS; and the second communications node is further configured to determine, according to the measurement signal or the measurement signal configuration information, a signal to be measured, and measure the signal to be measured to obtain the measurement result.

With reference to the second aspect or the first possible implementation manner of the second aspect, in a second possible implementation manner, the measurement signal configuration information includes at least one of the following:

frequency domain resource configuration information, code domain resource configuration information, subframe configuration information, space domain information, and pattern information on a unit resource.

With reference to the second aspect, or the first or the second possible implementation manner of the second aspect, in a third possible implementation manner, the measurement signal configuration information includes configuration information of a DRS.

With reference to the second aspect, or the first or the second or the third possible implementation manner of the second aspect, in a fourth possible implementation manner, the measurement information further includes: a mapping relationship between the configuration information of the DRS and a CSI-RS.

With reference to the second aspect, or the first or the second or the third or the fourth possible implementation manner of the second aspect, in a fifth possible implementation manner, the configuration information of the DRS includes at least one of the following:

antenna port information, frequency domain resource configuration information, code domain resource configuration information, subframe configuration information, pattern information on a unit resource, and a ratio of transmit power of a physical downlink shared channel (PDSCH) to that of the DRS.

With reference to the second aspect, or the first or the second or the third or the fourth or the fifth possible implementation manner of the second aspect, in a sixth possible implementation manner, the subframe configuration information includes: subframe shift information and period information.

With reference to the second aspect, or the first or the second or the third or the fourth or the fifth or the sixth possible implementation manner of the second aspect, in a seventh possible implementation manner, the configuration information of the DRS further includes: synchronization information, where the synchronization information includes at least one of the following: a radio frame number shift, a subframe shift, and a time symbol shift.

With reference to the second aspect, or the first or the second or the third or the fourth or the fifth or the sixth or the seventh possible implementation manner of the second aspect, in an eighth possible implementation manner, the measurement signal configuration information includes: configuration information of a CRS sent in a partial subframe, where the configuration information of the CRS sent in the partial subframe includes at least one of the following:

frequency domain resource configuration information, subframe configuration information, and pattern information on a unit resource, where the subframe configuration information includes: subframe shift information and period information.

With reference to the second aspect, or the first or the second or the third or the fourth or the fifth or the sixth or the seventh or the eighth possible implementation manner of the second aspect, in a ninth possible implementation manner, the measurement information further includes: a neighboring cell identity.

With reference to the second aspect, or the first or the second or the third or the fourth or the fifth or the sixth or the seventh or the eighth or the ninth possible implementation manner of the second aspect, in a tenth possible implementation manner, the measurement information further includes: a measurement signal type.

With reference to the second aspect, or the first or the second or the third or the fourth or the fifth or the sixth or the seventh or the eighth or the ninth or the tenth possible implementation manner of the second aspect, in an eleventh possible implementation manner, the measurement signal type includes at least one of the following: CRS whole-set measurement, CRS restricted measurement, CSI-RS measurement, DRS measurement, CRS and DRS hybrid measurement, CSI-RS and DRS hybrid measurement, CRS and CSI-RS hybrid measurement, and DRS, CRS and, CSI-RS hybrid measurement.

With reference to the second aspect, or the first or the second or the third or the fourth or the fifth or the sixth or the seventh or the eighth or the ninth or the tenth or the eleventh possible implementation manner of the second aspect, in a twelfth possible implementation manner, the measurement information further includes: measurement type configuration information.

With reference to the second aspect, or the first or the second or the third or the fourth or the fifth or the sixth or the seventh or the eighth or the ninth or the tenth or the eleventh or the twelfth possible implementation manner of the second aspect, in a thirteenth possible implementation manner, if a measurement report carries a measurement result, corresponding to a DRS resource, of measurement performed by using a DRS, and after the first communications node receives the measurement report sent by the second communications node, the method further includes: sending configuration information of a CRS and/or configuration information of a CSI-RS to the second communications node.

With reference to the second aspect, or the first or the second or the third or the fourth or the fifth or the sixth or the seventh or the eighth or the ninth or the tenth or the eleventh or the twelfth or the thirteenth possible implementation manner of the second aspect, in a fourteenth possible implementation manner, the measurement information further includes: report configuration information, used to indicate a manner of sending the measurement report by the second communications node.

With reference to the second aspect, or the first or the second or the third or the fourth or the fifth or the sixth or the seventh or the eighth or the ninth or the tenth or the eleventh or the twelfth or the thirteenth or the fourteenth possible implementation manner of the second aspect, in a fifteenth possible implementation manner, the report configuration information further includes:

a period value of reporting the measurement result by the second communications node from a bottom layer to a higher layer; or a quantity value of measurement signals in the measurement result reported by the second communications node from a bottom layer to a higher layer.

With reference to the second aspect, or the first or the second or the third or the fourth or the fifth or the sixth or the seventh or the eighth or the ninth or the tenth or the eleventh or the twelfth or the thirteenth or the fourteenth or the fifteenth possible implementation manner of the second aspect, in a sixteenth possible implementation manner, the report configuration information includes a period value of reporting measurement by the second communications node from the bottom layer to the higher layer.

With reference to the second aspect, or the first or the second or the third or the fourth or the fifth or the sixth or the seventh or the eighth or the ninth or the tenth or the eleventh or the twelfth or the thirteenth or the fourteenth or the fifteenth or the sixteenth possible implementation manner of the second aspect, in a seventeenth possible implementation manner, the measurement signal configuration information further includes at least one set of configuration information of a GAP, where:

the configuration information of the GAP includes: a period of starting the GAP, an initial position, and length of one or more GAPs; or the configuration information of the GAP includes pattern information of GAP configuration; or the configuration information of the GAP includes a quantity value of measurement signals to be measured.

With reference to the second aspect, or the first or the second or the third or the fourth or the fifth or the sixth or the seventh or the eighth or the ninth or the tenth or the eleventh or the twelfth or the thirteenth or the fourteenth or the fifteenth or the sixteenth or the seventeenth possible implementation manner of the second aspect, in an eighteenth possible implementation manner, the configuration information of the GAP further includes at least one of the following:

a measurement signal type corresponding to each set of configuration information of the GAP, and frequency and/or system information corresponding to each set of configuration information of the GAP.

A third aspect provides a measurement apparatus, located in a first communications node and including:

a first sending unit, configured to send measurement information to a second communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination; and a receiving unit, configured to receive a measurement report sent by the second communications node, where the measurement report carries a measurement result of measurement performed by the second communications node according to the measurement information.

In a first possible implementation manner of the third aspect, the measurement signal sent by the first sending unit is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

With reference to the third aspect or the first possible implementation manner of the third aspect, in a second possible implementation manner, the measurement signal configuration information sent by the first sending unit includes at least one of the following:

frequency domain resource configuration information, code domain resource configuration information, subframe configuration information, and pattern information on a unit resource.

With reference to the third aspect, or the first or the second possible implementation manner of the third aspect, in a third possible implementation manner, the measurement signal configuration information sent by the first sending unit includes configuration information of a DRS.

With reference to the third aspect, or the first or the second or the third possible implementation manner of the third aspect, in a fourth possible implementation manner, the measurement information sent by the first sending unit further includes: a mapping relationship between the configuration information of the DRS and a CSI-RS.

With reference to the third aspect, or the first or the second or the third or the fourth possible implementation manner of the third aspect, in a fifth possible implementation manner, the configuration information of the DRS sent by the first sending unit includes at least one of the following:

antenna port information, frequency domain resource configuration information, code domain resource configuration information, subframe configuration information, pattern information on a unit resource, and a ratio of transmit power of a physical downlink shared channel (PDSCH) to that of the DRS.

With reference to the third aspect, or the first or the second or the third or the fourth or the fifth possible implementation manner of the third aspect, in a sixth possible implementation manner, the subframe configuration information in the configuration information of the DRS sent by the first sending unit includes: subframe shift information and period information.

With reference to the third aspect, or the first or the second or the third or the fourth or the fifth or the sixth possible implementation manner, in a seventh possible implementation manner, the configuration information of the DRS sent by the first sending unit further includes: synchronization information, where the synchronization information includes at least one of the following: a radio frame number shift, a subframe shift, and a time symbol shift.

With reference to the third aspect, or the first or the second or the third or the fourth or the fifth or the sixth or the seventh possible implementation manner, in an eighth possible implementation manner, the measurement signal configuration information sent by the first sending unit includes: configuration information of a CRS sent in a partial subframe, where the configuration information of the CRS sent in the partial subframe includes at least one of the following:

frequency domain resource configuration information, subframe configuration information, and pattern information on a unit resource, where the subframe configuration information includes: subframe shift information and period information.

With reference to the third aspect, or the first or the second or the third or the fourth or the fifth or the sixth or the seventh or the eighth possible implementation manner of the third aspect, in a ninth possible implementation manner, the measurement information sent by the first sending unit further includes: a neighboring cell identity.

With reference to the third aspect, or the first or the second or the third or the fourth or the fifth or the sixth or the seventh or the eighth or the ninth possible implementation manner of the third aspect, in a tenth possible implementation manner, the measurement information sent by the first sending unit further includes: a measurement signal type.

With reference to the third aspect, or the first or the second or the third or the fourth or the fifth or the sixth or the seventh or the eighth or the ninth or the tenth possible implementation manner of the third aspect, in an eleventh possible implementation manner, the measurement signal type in the measurement information sent by the first sending unit includes at least one of the following:

CRS whole-set measurement, CRS restricted measurement, CSI-RS measurement, DRS measurement, CRS and DRS hybrid measurement, CSI-RS and DRS hybrid measurement, CRS and CSI-RS hybrid measurement, and DRS, CRS and, CSI-RS hybrid measurement.

With reference to the third aspect, or the first or the second or the third or the fourth or the fifth or the sixth or the seventh or the eighth or the ninth or the tenth or the eleventh possible implementation manner of the third aspect, in a twelfth possible implementation manner, the measurement information sent by the first sending unit further includes: measurement type configuration information.

With reference to the third aspect, or the first or the second or the third or the fourth or the fifth or the sixth or the seventh or the eighth or the ninth or the tenth or the eleventh or the twelfth possible implementation manner of the third aspect, in a thirteenth possible implementation manner, if the measurement report received by the receiving unit carries a measurement result, corresponding to a DRS resource, of measurement performed by using a DRS, and after the receiving unit receives the measurement report sent by the second communications node, the apparatus further includes:

a third sending unit, configured to send configuration information of a CRS and/or configuration information of a CSI-RS to the second communications node.

With reference to the third aspect, or the first or the second or the third or the fourth or the fifth or the sixth or the seventh or the eighth or the ninth or the tenth or the eleventh or the twelfth or the thirteenth possible implementation manner of the third aspect, in a fourteenth possible implementation manner, the measurement information sent by the first sending unit further includes: report configuration information, used to indicate a manner of sending the measurement report by the second communications node.

With reference to the third aspect, or the first or the second or the third or the fourth or the fifth or the sixth or the seventh or the eighth or the ninth or the tenth or the eleventh or the twelfth or the thirteenth or the fourteenth possible implementation manner of the first aspect, in a fifteenth possible implementation manner, the report configuration information sent by the first sending unit further includes:

a period value of reporting the measurement result by the second communications node from a bottom layer to a higher layer; or a quantity value of measurement signals in the measurement result reported by the second communications node from a bottom layer to a higher layer.

With reference to the third aspect, or the first or the second or the third or the fourth or the fifth or the sixth or the seventh or the eighth or the ninth or the tenth or the eleventh or the twelfth or the thirteenth or the fourteenth or the fifteenth possible implementation manner of the third aspect, in a sixteenth possible implementation manner, the measurement signal configuration information sent by the first sending unit further includes at least one set of configuration information of a GAP, where the configuration information of the GAP includes: a period of starting the GAP, an initial position, and length of one or more GAPs; or the configuration information of the GAP includes pattern information of GAP configuration; or the configuration information of the GAP includes a quantity value of measurement signals to be measured.

With reference to the third aspect, or the first or the second or the third or the fourth or the fifth or the sixth or the seventh or the eighth or the ninth or the tenth or the eleventh or the twelfth or the thirteenth or the fourteenth or the fifteenth or the sixteenth possible implementation manner of the third aspect, in a seventeenth possible implementation manner, the configuration information of the GAP in the measurement signal configuration information sent by the first sending unit further includes at least one of the following:

a measurement signal type corresponding to each set of configuration information of the GAP, and frequency and/or system information corresponding to each set of configuration information of the GAP.

A fourth aspect provides a measurement apparatus, located in a second communications node and including:

a first receiving unit, configured to receive measurement information sent by a first communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination; and a measurement unit, configured to determine, according to the measurement signal configuration information in the measurement information, the measurement signal resource corresponding to the measurement signal configuration information, and/or determine, according to the configuration information of the measurement signal combination in the measurement information, the measurement signal resource corresponding to the configuration information of the measurement signal combination; and measure the measurement signal corresponding to the resource to obtain a measurement result; and a sending unit, configured to send the measurement result to the first communications node.

In a first possible implementation manner of the fourth aspect, the measurement signal received by the first receiving unit is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

A fifth aspect provides a communications node, including:

a transceiver, configured to: send measurement information to a transceiver of a second communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination; and receive a measurement report sent by the transceiver of the second communications node, where the measurement report carries a measurement result of measurement performed by the second communications node according to the measurement information.

In a first possible implementation manner of the fifth aspect, the measurement signal sent by the transceiver is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

A sixth aspect provides a communications node, including:

a transceiver, configured to receive measurement information sent by a transceiver of a first communications node, where the measurement information includes measurement signal configuration information and/or configuration information of a measurement signal combination, the measurement signal configuration information is used by the communications node to determine a measurement signal resource corresponding to the measurement signal configuration information, and the configuration information of the measurement signal combination is used by the communications node to determine a measurement signal resource corresponding to the configuration information of the measurement signal combination; and a processor, configured to: determine, according to the measurement information received by the transceiver, the measurement signal resource corresponding to the measurement signal configuration information, and/or determine, according to the configuration information of the measurement signal combination in the measurement information, the measurement signal resource corresponding to the configuration information of the measurement signal combination; and measure the measurement signal corresponding to the resource to obtain a measurement result; where:

the transceiver is further configured to send the measurement result to the transceiver of the first communications node.

In a first possible implementation manner of the sixth aspect, the measurement signal received by the transceiver is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

A seventh aspect provides a cell measurement method, including:

sending, by a first communications node, discovery reference signal (DRS) signaling to a second communications node, so that the second communications node discovers and/or measures the first communications node by using the signaling; where:

the DRS signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets.

In a first possible implementation manner of the seventh aspect, the DRS signaling is further used to instruct the second communications node to synchronize with the first communications node by using the signaling; where:

a physical sequence of the discovery reference signal (DRS) signaling and/or a position of the DRS signaling on a radio resource is different from that in a synchronization channel.

With reference to the seventh aspect or the first possible implementation manner of the seventh aspect, in a second possible implementation manner, a DRS resource of the fixed subset is used to instruct the second communications node to perform cell discovery and/or measurement in a cell selection stage; and a DRS resource of the flexible subset is used to instruct the second communications node to perform cell measurement and/or time-frequency tracking after the second communications node reads a broadcast message or receives dedicated signaling.

An eighth aspect provides a cell measurement method, including:

receiving, by a second communications node, discovery reference signal (DRS) signaling sent by a first communications node, where the signaling is used to indicate that DRS positions and patterns of all cells controlled by the first communications node are fixed; or used to indicate that a DRS position and a corresponding pattern of each cell controlled by the first communications node are fixed, where the DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, any two of the cells have different flexible subsets; and discovering and/or measuring, by the second communications node, the first communications node by using the signaling.

In a first possible implementation manner of the eighth aspect, the DRS signaling is further used to instruct the second communications node to synchronize with the first communications node by using the signaling; where:

a physical sequence of the discovery reference signal (DRS) signaling and/or a position of the DRS signaling on a radio resource is different from that in a synchronization channel.

With reference to the eighth aspect or the first possible implementation manner of the eighth aspect, in a second possible implementation manner, a DRS resource of the fixed subset is used to instruct the second communications node to perform cell discovery and/or measurement in a cell selection stage; and a DRS resource of the flexible subset is used to instruct the second communications node to perform cell measurement and/or time-frequency tracking after the second communications node reads a broadcast message or receives dedicated signaling.

A ninth aspect provides a cell measurement apparatus, located in a first communications node and including:

a sending unit, configured to send discovery reference signal (DRS) signaling to a second communications node, so that the second communications node discovers and/or measures the first communications node by using the signaling; where:

the DRS signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets.

In a first possible implementation manner of the ninth aspect, the DRS signaling sent by the sending unit is further used to instruct the second communications node to synchronize with the first communications node by using the signaling; where:

a physical sequence of the discovery reference signal (DRS) signaling and/or a position of the DRS signaling on a radio resource is different from that in a synchronization channel.

A tenth aspect provides a cell measurement apparatus, located in a second communications node and including:

a receiving unit, configured to receive discovery reference signal (DRS) signaling sent by a first communications node, where the signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets; and a management unit, configured to enable the second communications node to discover and/or measure the first communications node by using the signaling.

In a first possible implementation manner of the tenth aspect, the DRS signaling received by the receiving unit is further used to instruct the second communications node to synchronize with the first communications node by using the signaling; where:

a physical sequence of the discovery reference signal (DRS) signaling and/or a position of the DRS signaling on a radio resource is different from that in a synchronization channel.

An eleventh aspect provides a communications node, including:

a transceiver, configured to send discovery reference signal (DRS) signaling to a second communications node, so that the second communications node discovers and/or measures the communications node by using the signaling; where:

the DRS signaling is used to indicate that DRS positions and patterns of all cells controlled by the communications node are fixed; or used to indicate that a DRS position and a corresponding pattern of each cell controlled by the communications node are fixed, where DRS positions and corresponding patterns of different cells are the same or different; or used to indicate that a DRS position and a pattern of each cell controlled by the communications node are configurable; or used to indicate that DRS resources of each of cells controlled by the communications node are classified into two types: one is a fixed subset, where the cells have a same fixed subset, and the other is a flexible subset, where any two of the cells have different flexible subsets.

In a first possible implementation manner of the eleventh aspect, the DRS signaling sent by the transceiver is further used to instruct the second communications node to synchronize with the communications node by using the signaling; where:

a physical sequence of the discovery reference signal (DRS) signaling and/or a position of the DRS signaling on a radio resource is different from that in a synchronization channel.

A twelfth aspect provides a communications node, including:

a transceiver, configured to receive discovery reference signal (DRS) signaling sent by a first communications node, where the signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets; and a processor, configured to discover and/or measure the first communications node by using the signaling.

In a first possible implementation manner of the twelfth aspect, the DRS signaling received by the transceiver is further used to instruct the communications node to synchronize with the first communications node by using the signaling; where:

a physical sequence of the discovery reference signal (DRS) signaling and/or a position of the DRS signaling on a radio resource is different from that in a synchronization channel.

It can be known from the foregoing technical solutions that, in the embodiments of the present invention, a first communications node configures measurement information for a second communications node, and sends the measurement information to the second communications node, so that the second communications node measures a measurement signal corresponding to measurement signal configuration information in the measurement information, and feeds back a measurement result to the first communications node, and so that the first communications node manages the second communications node.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 5B is a schematic diagram showing that multiple types of signaling are sent and coexist according to an embodiment of the present invention;

FIG. 6 is a flowchart of a cell measurement method according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely a part of embodiments of the present invention rather than all of the embodiments. All other embodiments obtained by a person of ordinary skill in the art based on the embodiments of the present invention without creative efforts shall fall within the protection scope of the present invention.

A measurement behavior described in the present invention is specifically an action of detecting a cell (also referred to as identifying a cell, discovering a cell, or the like) and/or an action of measuring a cell.

Figure 1:
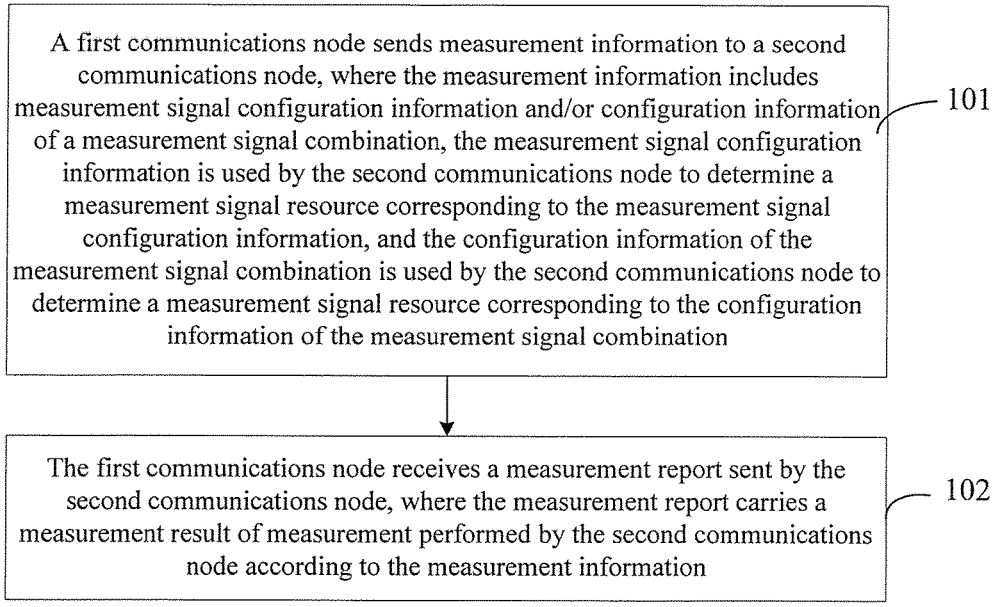
FIG. 1 is a flowchart of a measurement method according to an embodiment of the present invention.

Refer to FIG. 1. FIG. 1 is a flowchart of a measurement method according to an embodiment of the present invention, where the method includes:

Step 101: A first communications node sends measurement information to a second communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination.

The measurement information may be sent by the first communications node to the second communications node by using dedicated signaling, and may also be sent by using a system message. Information in the measurement information includes measurement information of a cell/frequency of the first communications node, and may further include measurement information of another neighboring cell/frequency.

The measurement information is used by the second communications node to detect a cell corresponding to the measurement information; or the measurement information is used by the second communications node to detect a cell corresponding to the measurement information, and further measure the cell corresponding to the measurement information; or the measurement information is used by the second communications node to measure a cell corresponding to the measurement information.

In an embodiment, the first communications node may be a base station, and the second communications node may be a UE (in this embodiment, may be one UE, and may also be multiple UEs, which is not limited in this embodiment). The base station sends the measurement information configured by the base station to a user equipment UE, so that the UE determines, according to the measurement signal configuration information in the measurement information, a measurement signal resource corresponding to the measurement signal configuration information, and measures the measurement signal corresponding to the resource; and subsequently, the UE may send a measurement result to the base station.

In another embodiment, both the first communications node and the second communications node may be UEs. In this case, a UE serving as the first communications node may configure measurement information for another UE (that is, the second communications node), and send the configured measurement information to the another UE (may be one UE, and may also be multiple UEs, which is not limited in this embodiment); after receiving the measurement information, the another UE determines, according to the measurement signal configuration information in the measurement information, a measurement signal resource corresponding to the measurement signal configuration information, and measures the measurement signal corresponding to the resource; and subsequently, the another UE (that is, the second communications node) sends a measurement result to the UE (that is, the first communications node).

In another embodiment, both the first communications node and the second communications node may be base stations, and in this case, a base station serving as the second communications node integrates a measurement function of a UE. A base station (that is, the first communications node) configures measurement information for another base station (that is, the second communications node), and sends the configured measurement information to the another base station; after receiving the measurement information, the another base station determines, according to the measurement information, a corresponding measurement signal resource according to the measurement information, and measures the measurement signal corresponding to the resource; and subsequently, the another base station (that is, the second communications node) sends a measurement result to the base station (that is, the first communications node).

In another embodiment, before step 101, the first communications node obtains measurement information of a neighboring cell.

The first communications node may obtain the measurement information of the neighboring cell through an X2 interface, or another interface (for example, a radio interface) between two base stations, or operations, administration and maintenance (OAM). Specifically, for example, when an interface between the first communications node and a third communications node is set up, the first communications node receives cell information, sent by the neighboring third communications node, of a cell of the neighboring third communications node, where the cell information includes information such as a carrier frequency band of the cell, a carrier type, a cell identity (ID), and measurement signal configuration information; and optionally, further includes a carrier type of a designated carrier of the neighboring third communications node.

Step 102: The first communications node receives a measurement report sent by the second communications node, where the measurement report carries a measurement result of measurement performed by the second communications node according to the measurement information.

In this embodiment, the first communications node receives the measurement report sent by the second communications node (may be a UE or a base station integrating a function of a UE), where the measurement report carries the measurement result of the measurement performed by the second communications node according to the measurement information. Subsequently, the first communications node manages the second communications node according to the measurement result. Two cases are used as examples below to describe a process in which the first communications node manages the second communications node according to the measurement result in the embodiment of the present invention, but the present invention is not limited to the following two cases; management may also be performed for other cases according to different content included in the measurement result, which is not limited in this embodiment.

In one case, after obtaining the measurement report, the first communications node can determine signal quality and signal strength of the measured cell/carrier according to the measurement result, and manage the second communications node and the measured cell/carrier, where the management performed on the second communications node and the measured cell/carrier includes that: the first communications node determines whether to add or delete a carrier for the second communications node, or add or delete a cell in a COMP set, or determines whether to hand over the second communications node into or out of the measured cell/carrier.

In the other case, after obtaining the measurement report, the first communications node can determine signal quality of the UE in a serving cell/carrier (set) according to the measurement result, and select a scheduling mechanism that is suitable for the second communications node.

That is, in this embodiment, the first communications node receives the measurement report reported by the second communications node, where the measurement report includes a measurement result that is obtained after the second communications node performs measurement on a designated cell/carrier according to the measurement information. Two cases are used as examples below, but the present invention is not limited thereto.

In the embodiment of the present invention, the first communications node configures measurement information for the second communications node, and sends the measurement information to the second communications node, so that the second communications node measures a measurement signal corresponding to measurement signal configuration information in the measurement information, and feeds back the measurement result to the first communications node, and so that the first communications node manages the second communications node.

The measurement information may be sent by the first communications node to the second communications node by using dedicated signaling, and may also be sent by using a system message. Information in the measurement information includes measurement information of a cell/frequency of the first communications node, and may further include measurement information of another neighboring cell/frequency.

The measurement information is used by the second communications node to detect a cell corresponding to the measurement information; or the measurement information is used by the second communications node to detect a cell corresponding to the measurement information, and further measure the cell corresponding to the measurement information; or the measurement information is used by the second communications node to measure a cell corresponding to the measurement information.

The measurement information includes measurement signal configuration information and/or configuration information of a measurement signal combination, where the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination.

The measurement signal is a discovery reference signal (DRS).

The measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS. After receiving the measurement information, the second communications node performs cell discovery and/or cell measurement by using at least one of the foregoing measurement signals or a measurement signal combination.

In the embodiment of the present invention, the DRS is a new signal for cell discovery/cell identification/cell measurement (the symbol "/" indicates an "and/or" relationship), and may also be called track reference signal (TRS) or discovery signal (DS); the name is not limited thereto.

Optionally, for the CRS sent in the partial subframe, the first communications node sends configuration information of the CRS, and the configuration information of the CRS sent in the partial subframe includes at least one of the following:

frequency domain resource configuration information, subframe configuration information, and pattern information on a unit resource, where the subframe configuration information includes: subframe shift information and period information, and for the CRS sent in a full subframe, configuration information of the CRS in a time domain is not needed to be notified.

Optionally, based on all the foregoing embodiments, in another embodiment, the measurement signal configuration information includes at least one of the following: frequency domain resource configuration information, code domain resource configuration information, subframe configuration information, space domain information, and pattern information on a unit resource.

The frequency domain resource configuration information is used by the second communications node to determine a frequency domain resource, such as specific sub-carrier information or physical resource block (PRB) information, of the measurement signal corresponding to the measurement signal configuration information.

The frequency domain resource configuration information is used by the second communications node to receive a signal in all or a part of positions designated by the frequency domain resource configuration information, so as to perform further measurement.

The code domain resource configuration information may include, but is not limited to, an address code, a scrambling code, a sequence code, and a sequence initialization code, where the code domain resource configuration information is used by the second communications node to identify whether the received signal is a signal to be received.

The subframe configuration information may include, but is not limited to, subframe shift information and period information, where the subframe configuration information is used by the second communications node to receive signaling in all or a part of subframes designated by the subframe configuration information, so as to perform further measurement.

The pattern information on the unit resource includes signal distribution in a time domain (for example, granularity of a time symbol) and/or frequency domain (for example, granularity of sub-carrier information) on the unit resource (for example, one subframe). The pattern information on the unit resource is used by the second communications node to receive a signal in all or a part of positions designated by the unit resource, so as to perform further measurement.

The space domain information may include, but is not limited to, antenna information (the number of antenna ports), wave beam information, flow information, and spatial encoding matrix information, where the space domain information is used by the second communications node to receive signaling in all or a part of positions designated by the space domain information, so as to perform further measurement. When any piece of the foregoing information has been learnt before the second communications node receives the configuration information, for example, the information has been sent in a system message of the first communications node or the information is defined in a communications protocol (for example, TS 3GPP36.211), the second communications node may be not informed by using the configuration information.

Optionally, based on all the foregoing embodiments, in another embodiment, the measurement signal configuration information includes: configuration information of a DRS; correspondingly, the measurement information may further include a mapping relationship between the configuration information of the DRS and a CSI-RS.

Optionally, based on all the foregoing embodiments, in another embodiment, the configuration information of the DRS includes at least one of the following: antenna port information (may include an antenna quantity and/or an antenna port number), frequency domain resource configuration information, code domain resource configuration information, subframe configuration information, pattern information on a unit resource, and a ratio of transmit power of a physical downlink shared channel (PDSCH) to that of the DRS. For the frequency domain resource configuration information, the code domain resource configuration information, the subframe configuration information, and the pattern information on the unit resource, refer to the foregoing description. Therefore, no further details are repeated herein.

The subframe configuration information may include, but is not limited to, subframe shift information and period information, and may further include other information, which is not limited in this embodiment.

Optionally, based on the foregoing corresponding configuration embodiment, in another embodiment, the configuration information of the DRS may further include: synchronization information, where the synchronization information includes at least one of the following: a radio frame number shift, a subframe shift, and a time symbol shift.

Optionally, based on all the foregoing embodiments, in another embodiment, the measurement signal configuration information includes: configuration information of a CRS sent in a partial subframe, and the configuration information of the CRS sent in the partial subframe includes at least one of the following: frequency domain resource configuration information, subframe configuration information, and pattern information on a unit resource, where the subframe configuration information includes: subframe shift information and period information.

Optionally, based on all the foregoing embodiments, in another embodiment, the measurement information further includes: a neighboring cell identity. The neighboring cell identity includes at least one of a physical cell identity (PCI), a DRS identity, and a CSI-RS identity, but the present invention is not limited thereto.

Optionally, based on all the foregoing embodiments, in another embodiment, the measurement information may further include: a measurement signal type, where the measurement signal type may include, but is not limited to, at least one of the following: CRS whole-set measurement, CRS restricted measurement, CSI-RS measurement, DRS measurement, CRS and DRS hybrid measurement, CSI-RS and DRS hybrid measurement, CRS and CSI-RS hybrid measurement, and DRS, CRS and, CSI-RS hybrid measurement.

Optionally, based on all the foregoing embodiments, in another embodiment, the measurement information further includes: measurement type configuration information, where the measurement type configuration information includes at least one of the following: RRM measurement, RLM measurement, a CSI value, and at least one of CA, COMP, and MSA member maintenance measurement.

Optionally, based on all the foregoing embodiments, in another embodiment, if the measurement report carries a measurement result, corresponding to a DRS resource, of measurement performed by using a DRS, and after the first communications node receives the measurement report sent by the second communications node, the method may further include: sending configuration information of a CRS and/or configuration information of a CSI-RS to the second communications node.

Optionally, based on all the foregoing embodiments, in another embodiment, the measurement information may further include: report configuration information, which is used to indicate a manner of sending the measurement report by the second communications node. That is, a period value of reporting measurement from a bottom layer to a higher layer is added in the report configuration information. Optionally, for this value, precision and a transmission period of the DRS need to be taken into consideration.

Optionally, the report configuration information may further include: a period value of reporting the measurement result by the second communications node from a bottom layer to a higher layer; or a quantity value of measurement signals in the measurement result reported by the second communications node from a bottom layer to a higher layer, where the report configuration information includes the period value of reporting measurement from a bottom layer to a higher layer. Optionally, the period value is determined by the first communications node according to a sending precision and a transmission period of the measurement signal.

That is, in the foregoing embodiment, in the measurement information, which may also be construed as a measurement task, sent by the first communications node to the second communications node, each measurement task may include measurement object information and report configuration information, where the measurement object information is used to indicate a designated cell/carrier that needs to be measured by the UE, and the report configuration information is used to determine configuration information for triggering the second communications node (for example, a UE or a base station integrating a UE) to send a measurement report to the first communications node. The measurement object information and the report configuration information are information element messages in the measurement task, and the first communications node may preferably add reference signal indication information in the measurement object information, and may also add the reference signal indication information in the report configuration information, which is not limited in this embodiment.

The measurement object information includes a combination of at least one of a neighboring cell identity, a measurement signal type, measurement type configuration information, measurement signal configuration information, and a report configuration information indication. Conventional cell configuration sent by the first communications node to the second communications node is conventional measurement configuration based on a CRS/CSI-RS, while enhanced cell configuration sent by the first communications node to the second communications node is a new measurement manner (that is, the measurement signal type).

The measurement information may include a combination of at least one of the neighboring cell identity, frequency information, a PCI, a DRS (set) identity, and a CSI-RS (set) identity. In addition to at least one of the CRS whole-set measurement, the CRS restricted measurement, and the CSI-RS measurement, the measurement signal type may further at least include: DRS measurement, CRS and DRS hybrid measurement, CSI-RS and DRS hybrid measurement, CRS and CSI-RS hybrid measurement, or DRS, CRS, and CSI-RS hybrid measurement. For the measurement type configuration information, if neighboring cell measurement is performed, the measurement type configuration information is RRM measurement by default, and explicit signaling configuration is not needed; if serving cell measurement is performed, the first communications node (for example, the base station) needs to notify the second communications node (for example, a UE) that the measurement type corresponding to the measurement signal in the measurement object information is a combination of at least one of the RRM measurement, RLM measurement, CSI-value reporting measurement, and CA/COMP/MSA member maintenance measurement, where the CA/COMP/MSA may include one or more of CA, COMP, and MSA.

The measurement type configuration information includes CRS restricted measurement information (for example, an initial position, which may use a period of 5 ms). The configuration information of the DRS includes: antenna port information (the antenna port information may be an antenna quantity and/or an antenna port number), frequency domain resource configuration information, code domain resource configuration information, subframe configuration information (including subframe shift information and period information), and a ratio, assumed by the UE, of transmit power of a PDSCH to that of the DRS; and may further include: synchronization information of a measured cell, for example, an SFN shift, a subframe shift, and/or a symbol shift.

In addition, the DRS configuration may be a whole-set subframe or a subset of a DRS subframe. When the measured cell has ABS configuration, the second communications node may perform measurement by using an intersection of the measurement configuration set and a delivered set of restricted measurement, but the present invention is not limited thereto, and may further include other manners, which is not limited in this embodiment.

For the selection of the measurement signal type, the first communications node (for example, the base station) may select a measurement signal type in a specific scenario according to a radio signal change of a cell. For example, if the radio signal of the cell changes fast, in order to avoid a ping-pong handover or premature handover caused by dependence only on the DRS measurement, the CRS and DRS hybrid measurement, the CSI-RS and DRS hybrid measurement, the DRS, CRS, and CSI-RS hybrid measurement, or the like may be used.

For example, the second communications node (for example, a UE) first obtains an initial value of a neighboring cell by measuring the DRS, and then measures the CRS and/or the CSI-RS to meet the subsequent hysteresis and TTT report requirements.

A period value of reporting measurement from a bottom layer to a higher layer is added in the report configuration information. Optionally, for this value, precision and a transmission period of the DRS need to be taken into consideration.

That is, the measurement signal configuration information may further include measurement indication information of the measured cell, such as m-RSRP measurement indication information and/or m-RSRQ measurement indication information (m may be the CRS, the CSI-RS, and/or the DRS); the measurement signal configuration information may further include measurement reporting manner indication information, used to instruct the second communications node (for example, a UE) to perform either periodic measurement reporting or event measurement reporting on the measured cell. If the measurement reporting manner indication information indicates that the reporting manner is the event measurement reporting, the measurement signal configuration information may further include a configuration hysteresis value and hysteresis time, a maximum quantity of measured cells that can be reported and a quantity of reporting times, and/or other auxiliary configuration parameters such as a parameter regarding layer-3 smooth filtering. If the measurement reporting manner indication information indicates that the reporting manner is periodic measurement reporting, the measurement configuration message may further include a configuration report period. Certainly, the foregoing parameters may be pre-configured in the second communications node by default, which is not limited in this embodiment.

Optionally, based on all the foregoing embodiments, in another embodiment, the measurement signal configuration information may further include at least one set of configuration information of a GAP, where the configuration information of the GAP includes: a period of starting the GAP, an initial position, and length of one or more GAPs; or the configuration information of the GAP includes pattern information of GAP configuration; or the configuration information of the GAP includes a quantity value of measurement signals to be measured.

The configuration information of the GAP may further include at least one of the following: a measurement signal type corresponding to each set of configuration information of the GAP, and frequency and/or system information corresponding to each set of configuration information of the GAP.

That is, in the foregoing embodiment, especially, a new GAP configuration mechanism is introduced into configuration of inter-frequency measurement: a GAP format is flexible, and the GAP format may match a pattern of the DRS, if a period of a DRS of a cell is 400 ms and the DRS appears twice in a zeroth subframe and a first subframe of the zeroth radio frame, a GAP format configured for the UE is a 2 ms GAP and the initial position is in the zeroth subframe of the zeroth radio frame in each 400 ms. Moreover, for the measurement period, precision and a transmission period of the DRS need to be taken into consideration. If one DRS subframe satisfies the measurement precision, the length of the GAP may be that of one frame, and the measurement period is 1 ms; if three DRS subframes satisfy the measurement precision and three DRS subframes are distributed within six subframes, the length of the GAP may be 1 ms or 6 ms, and the measurement period is 6 ms.

Alternatively, in this embodiment, the first communications node (for example, the base station) configures multiple GAP pattern combinations for the second communications node (for example, a UE), or the first communications node notifies the second communications node of the multiple GAP pattern combinations. For example, the base station notifies the UE of a type of a GAP used to detect the SS, a type of a GAP used to detect the DRS, a type of a GAP used to detect the CRS, a type of a GAP used to detect the CSI-RS, or the like.

Figure 2:
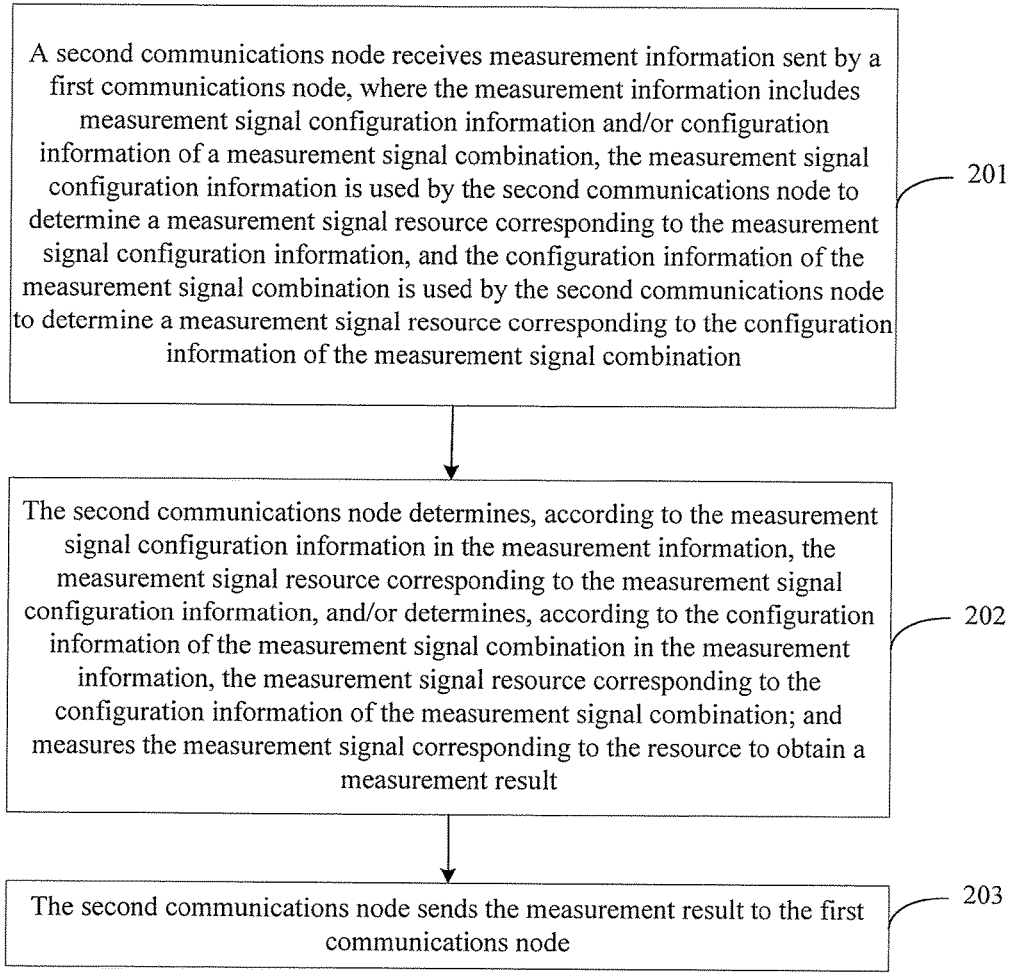
FIG. 2 is another flowchart of a measurement method according to an embodiment of the present invention.

Refer to FIG. 2, which is another flowchart of a measurement method according to an embodiment of the present invention, where the method includes:

Step 201: A second communications node receives measurement information sent by a first communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination.

In an embodiment, the first communications node may be a base station, and the second communications node may be a UE.

In another embodiment, both the first communications node and the second communications node may be UEs. In this case, a UE serving as the first communications node may configure measurement information for another UE (that is, the second communications node), and send the configured measurement information to the second communications node.

In another embodiment, both the first communications node and the second communications node may be base stations, and in this case, the base station serving as the second communications node integrates a measurement function of a UE.

Step 202: The second communications node determines, according to the measurement signal configuration information in the measurement information, the measurement signal resource corresponding to the measurement signal configuration information, and/or determines, according to the configuration information of the measurement signal combination in the measurement information, the measurement signal resource corresponding to the configuration information of the measurement signal combination; and measures the measurement signal corresponding to the resource to obtain a measurement result.

The determining, according to the measurement signal configuration information, the measurement signal resource corresponding to the measurement signal configuration information may be identical to or different from the determining, according to the configuration information of the measurement signal combination, the measurement signal resource corresponding to the configuration information of the measurement signal combination, which is not limited in this embodiment.

In this step, after receiving the measurement information, the second communications node may determine, according to the measurement information, a measurement signal resource to be measured, such as a position or a carrier; and then, measures the measurement signal corresponding to the resource.

That is, after receiving the measurement information sent by the first communications node (for example, a base station), the second communications node (for example, a UE or a base station integrating a function of a UE) may distinguish, according to a difference of RS configuration information of measured cell and/or configuration identities (for example, antenna port information or a configuration index number of CSI-RS/DRS configuration information) of the measured cells in the measurement configuration information in the measurement information, different measured cells indicated by a same physical cell identity, and perform a measurement operation.

The second communications node may perform the measurement on a corresponding measured cell by using signaling configuration information of the measured cell, to obtain a measurement result of the measured cell, such as DRS-RSRP and/or DRS-RSRQ of the measured cell. Optionally, the second communications node may bind the measurement result with at least one of signal configuration information in the measurement signal configuration information, a configuration identity of the measured cell, and a measurement index number. In a practical application, the second communications node may periodically measure the measured cell, and report a measurement result of the measured cell.

If the measurement information received by the second communications node includes measurement indication information such as m-RSRP measurement indication information and/or m-RSRQ measurement indication information, the second communications node may obtain, according to the measurement indication information, a measurement value required by the first communications node, and report the measurement value to the first communications node as the measurement result. For example, if the measurement information sent by the first communications node includes D-RSRP measurement indication information, the second communications node obtains the D-RSRP of the measured cell; and if the measurement information sent by the first communications node includes D-RSRQ measurement indication information, the second communications node obtains the D-RSRQ of the measured cell.

Step 203: The second communications node sends the measurement result to the first communications node.

The second communications node sends the measurement result to the first communications node, so that the first communications node manages the second communications node. For the specific management process, refer to the corresponding description in the foregoing embodiment. Therefore, no further details are repeated herein.

In the embodiment of the present invention, the second communications node performs measurement on a corresponding measurement signal according to the measurement signal configuration information in the received measurement information, and feeds back a measurement result to the first communications node, so that the first communications node manages the second communications node.

Optionally, based on all the foregoing embodiments, in another embodiment, in order to enhance the performance, the measurement signal is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

The second communications node is further configured to determine, according to the measurement signal or the measurement signal configuration information, a signal to be measured, and measure the signal to be measured to obtain a measurement result.

In this embodiment, the receiving the sent measurement information by the second communications node and the receiving the sent measurement signal or the measurement signal combination by the second communications node have no particular order in time, and may also be performed at the same time, which is not limited in this embodiment.

Optionally, based on all the foregoing embodiments, in another embodiment, the measurement signal configuration information includes at least one of the following: frequency domain resource configuration information, code domain resource configuration information, subframe configuration information, space domain information, and pattern information on a unit resource.

For specific definitions of the frequency domain resource configuration information, code domain resource configuration information, subframe configuration information, space domain information, and pattern information on the unit resource, reference may be made to the corresponding description in the foregoing embodiments, and therefore no further details is repeated herein.

Optionally, based on all the foregoing embodiments, in another embodiment, the measurement signal configuration information includes: configuration information of a DRS. Further, the measurement information may further include: a mapping relationship between the configuration information of the DRS and the CSI-RS.

The configuration information of the DRS includes at least one of the following: antenna port information, frequency domain resource configuration information, code domain resource configuration information, subframe configuration information, pattern information on a unit resource, and a ratio of transmit power of a physical downlink shared channel (PDSCH) to that of the DRS. For the antenna port information, frequency domain resource configuration information, code domain resource configuration information, subframe configuration information, pattern information on the unit resource, reference may be specifically made to the corresponding description in the foregoing embodiments, and therefore no further details is repeated herein.

Optionally, based on all the foregoing embodiments, in another embodiment, the subframe configuration information includes: subframe shift information and period information.

Optionally, based on all the foregoing embodiments, in another embodiment, the configuration information of the DRS further includes: synchronization information, where the synchronization information includes at least one of the following: a radio frame number shift, a subframe shift, and a time symbol shift.

Optionally, based on all the foregoing embodiments, in another embodiment, the measurement signal configuration information includes: configuration information of a CRS sent in a partial subframe, and the configuration information of the CRS sent in the partial subframe includes at least one of the following: frequency domain resource configuration information, subframe configuration information, and pattern information on a unit resource, where the subframe configuration information includes: subframe shift information and period information.

Optionally, based on all the foregoing embodiments, in another embodiment, the measurement information further includes: a neighboring cell identity, where the neighboring cell identity includes at least one of the following: a physical cell identity (PCI, Physical Cell Identity), a DRS identity, and a CSI-RS identity.

Optionally, based on all the foregoing embodiments, in another embodiment, the measurement information further includes: a measurement signal type, where the measurement signal type includes: CRS whole-set measurement, CRS restricted measurement, CSI-RS measurement, DRS measurement, CRS and DRS hybrid measurement, CSI-RS and DRS hybrid measurement, CRS and CSI-RS hybrid measurement, and DRS, CRS and, CSI-RS hybrid measurement.

In another aspect, if the measurement information received by the second communications node includes the measurement signal type, the second communications node may actively select, according to a new mechanism, a type of signaling to be measured and a measurement manner. For example, if the second communications node is connected to a macro cell, and a signal level and/or signal quality of a serving cell of the second communications node is higher than a threshold, for example, RSRP is greater than a certain threshold, the second communications node performs measurement on a neighboring cell by using a DRS measurement type; in contrast, if the signal level and/or signal quality of the serving cell of the second communications node is higher than a threshold, for example, the second communications node is connected to an edge of the cell and RSRP is smaller than a threshold, the second communications node may perform measurement on the neighboring cell by using 'CRS or CSI-RS or DRS with CRS/CSI-RS measurement type'. If the second communications node is connected to a small cell such as an NCT cell, the UE may perform measurement on the neighboring cell by using a DRS measurement type. The neighboring cell described in this embodiment may be an intra-frequency neighboring cell or an inter-frequency neighboring cell, which is not limited in this example.

In another aspect, the second communications node may also select a measurement signaling type by grasping a radio signal change of a cell in a specific scenario according to historical measurement signaling. For example, when the radio signal of the cell changes fast, in order to avoid a ping-pong handover and premature handover that are caused by dependence only on the DRS measurement, CRS and DRS hybrid measurement, CSI-RS and DRS hybrid measurement, or DRS, CRS and, CSI-RS hybrid measurement may be used. For example, the UE first obtains an initial value of a neighboring cell by measuring a DRS, and then measures a CRS and/or a CSI-RS to meet a subsequent reporting requirement of hysteresis and TTT.

Optionally, based on all the foregoing embodiments, in another embodiment, the measurement information further includes: measurement type configuration information.

Optionally, based on all the foregoing embodiments, in another embodiment, if the measurement report carries a measurement result, corresponding to a DRS resource, of measurement performed by using a DRS, and after the first communications node receives the measurement report sent by the second communications node, the method may further include: sending configuration information of a CRS and/or configuration information of a CSI-RS to the second communications node.

Optionally, based on all the foregoing embodiments, in another embodiment, the measurement information further includes: report configuration information, which is used to indicate a manner of sending the measurement report by the second communications node.

The report configuration information may further include: a period value of reporting the measurement result by the second communications node from the bottom layer to the higher layer, or a quantity value of the measurement signals in the measurement result reported by the second communications node from a bottom layer to a higher layer. Optionally, the period value of reporting measurement by the second communications node from the bottom layer to the higher layer is determined by the first communications node according to sending precision and a transmission period of the measurement signal.

Optionally, based on all the foregoing embodiments, in another embodiment, the measurement signal configuration information may further include at least one set of configuration information of a GAP, where the configuration information of the GAP includes: a period of starting the GAP, an initial position, and length of one or more GAPs; or the configuration information of the GAP includes pattern information of GAP configuration; or the configuration information of the GAP includes a quantity value of measurement signals to be measured.

Optionally, based on all the foregoing embodiments, in another embodiment, the configuration information of the GAP further includes at least one of the following: a measurement signal type corresponding to each set of configuration information of the GAP, and frequency and/or system information corresponding to each set of configuration information of the GAP.

Figure 3:
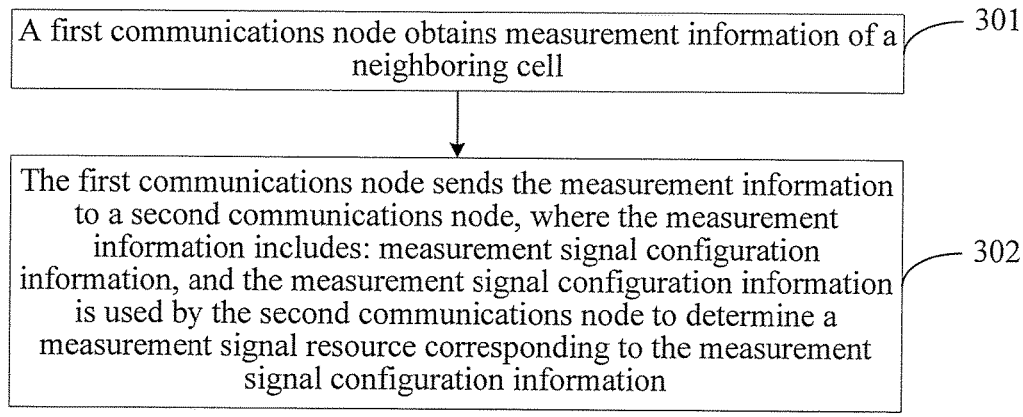
FIG. 3 is another flowchart of a measurement method according to an embodiment of the present invention.

Refer to FIG. 3. FIG. 3 is another flowchart of a measurement method according to an embodiment of the present invention, where the method includes:

Step 301: A first communications node obtains measurement information of a neighboring cell.

The measurement information of the neighboring cell may be obtained through an X2 interface, or another interface (for example, a wireless interface) between two base stations, or OAM.

Specifically, for example, when an interface between the first communications node and a third communications node is set up, the first communications node receives cell information, sent by the neighboring third communications node, of a cell under the coverage of the neighboring third communications node, where the cell information includes information such as a carrier frequency band of the cell, a carrier type, a cell identity (ID), and measurement signal configuration information.

Optionally, the cell information further includes a carrier type of a designated carrier of the neighboring third communications node.

Step 302: The first communications node sends the measurement information to a second communications node, where the measurement information includes: measurement signal configuration information, and the measurement signal configuration information is used by the second communications node to determine a measurement signal resource corresponding to the measurement signal configuration information.

In this embodiment, the measurement information may be sent by the first communications node to the second communications node by using dedicated signaling, and may also be sent by using a system message. Information in the measurement information includes measurement information of a cell/frequency of the first communications node, and may further include measurement information of another neighboring cell/frequency.

The measurement information is used by the second communications node to detect a cell corresponding to the measurement information; or the measurement information is used by the second communications node to detect a cell corresponding to the measurement information, and further measure the cell corresponding to the measurement information; or the measurement information is used by the second communications node to measure a cell corresponding to the measurement information.

In an embodiment, the first communications node may be a base station, and the second communications node may be a UE (in this embodiment, may be one UE, and may also be multiple UEs, which is not limited in this embodiment). The base station sends the measurement information configured by the base station to a user equipment UE, so that the UE determines, according to measurement signal configuration information in the measurement information, a measurement signal resource corresponding to the measurement signal configuration information, and measures the measurement signal corresponding to the resource.

In another embodiment, both the first communications node and the second communications node may be UEs. In this case, a UE serving as the first communications node may configure measurement information for another UE (that is, the second communications node), and send the configured measurement information to the another UE (may be one UE, and may also be multiple UEs, which is not limited in this embodiment); after receiving the measurement information, the another UE determines, according to the measurement signal configuration information in the measurement information, a measurement signal resource corresponding to the measurement signal configuration information, and measures the measurement signal corresponding to the resource.

In another embodiment, both the first communications node and the second communications node may be base stations, and in this case, a base station serving as the second communications node integrates a measurement function of a UE. A base station (that is, the first communications node) configures measurement information for another base station (that is, the second communications node) and sends the configured measurement information to the another base station; after receiving the measurement information, the another base station determines a corresponding measurement signal resource according to the measurement information, and measures the measurement signal corresponding to the resource.

The measurement signal is a discovery reference signal (DRS); the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS. After receiving the measurement information, the second communications node performs cell discovery and/or cell measurement by using at least one of the foregoing measurement signals or a measurement signal combination.

In the present invention, the DRS is a new signal for cell discovery/cell identification/cell measurement (the symbol "/" indicates an "and/or" relationship), and may also be called track reference signal (TRS) or discovery signal (DS); the name is not limited thereto.

Optionally, for the CRS sent in the partial subframe, the first communications node sends configuration information of the CRS, and the configuration information of the CRS sent in the partial subframe includes at least one of the following:

frequency domain resource configuration information, subframe configuration information, and pattern information on a unit resource, where the subframe configuration information includes: subframe shift information and period information; and for the CRS sent in a full subframe, configuration information of the CRS in a time domain is not needed to be notified.

Optionally, based on all the foregoing embodiments, in another embodiment, the measurement signal configuration information includes at least one of the following: frequency domain resource configuration information, code domain resource configuration information, subframe configuration information, space domain information, and pattern information on a unit resource.

The frequency domain resource configuration information is used by the second communications node to determine a frequency domain resource, such as specific sub-carrier information or physical resource block (PRB) information, of the measurement signal corresponding to the measurement signal configuration information.

The frequency domain resource configuration information is used by the second communications node to receive a signal in all or a part of positions designated by the frequency domain resource configuration information, so as to perform further measurement.

The code domain resource configuration information may include, but is not limited to, an address code, a scrambling code, a sequence code, and a sequence initialization code, where the code domain resource configuration information is used by the second communications node to identify whether the received signal is a signal to be received.

The subframe configuration information may include, but is not limited to, subframe shift information and period information, where the subframe configuration information is used by the second communications node to receive signaling in all or a part of subframes designated by the subframe configuration information, so as to perform further measurement.

The pattern information on the unit resource includes signal distribution in a time domain (for example, granularity of a time symbol) and/or frequency domain (for example, granularity of sub-carrier information) on the unit resource (for example, one subframe). The space domain information may include, but is not limited to, antenna information (the number of antenna ports), wave beam information, flow information, and spatial encoding matrix information, where the space domain information is used by the second communications node to receive signaling in all or a part of positions designated by the space domain information, so as to perform further measurement.

Optionally, based on all the foregoing embodiments, in another embodiment, the measurement signal configuration information includes: configuration information of a DRS; correspondingly, the measurement information may further include a mapping relationship between the configuration information of the DRS and a CSI-RS.

Optionally, based on all the foregoing embodiments, in another embodiment, the configuration information of the DRS includes at least one of the following: antenna port information (may include an antenna quantity and/or an antenna port number), frequency domain resource configuration information, code domain resource configuration information, subframe configuration information, pattern information on a unit resource, and a ratio of transmit power of a physical downlink shared channel (PDSCH) to that of the DRS. For the frequency domain resource configuration information, the code domain resource configuration information, the subframe configuration information, and the pattern information on the unit resource, refer to the foregoing description. Therefore, no further details are repeated herein.

The subframe configuration information may include, but is not limited to, subframe shift information and period information, and may further include other information, which is not limited in this embodiment.

Optionally, based on all the foregoing embodiments, in another embodiment, the configuration information of the DRS may further include: synchronization information, where the synchronization information includes at least one of the following: a radio frame number shift, a subframe shift, and a time symbol shift.

Optionally, based on all the foregoing embodiments, in another embodiment, the measurement signal configuration information includes: configuration information of a CRS sent in a partial subframe, and the configuration information of the CRS sent in the partial subframe includes at least one of the following: frequency domain resource configuration information, subframe configuration information, and pattern information on a unit resource, where the subframe configuration information includes: subframe shift information and period information.

Optionally, based on all the foregoing embodiments, in another embodiment, the measurement information further includes: a neighboring cell identity. The neighboring cell identity includes at least one of a physical cell identity (PCI), a DRS identity, identity information of the third communications node, and a CSI-RS identity, but the present invention is not limited thereto.

The measurement information may further include: synchronization information of a measured cell, for example, an SFN shift, a subframe shift, and/or a symbol shift.

In addition, the DRS configuration may be a whole-set subframe or a subset of a DRS subframe. When the measured cell has ABS configuration, the second communications node may perform measurement by using an intersection of the measurement configuration set and a delivered set of restricted measurement, but the present invention is not limited thereto, and may further include other manners, which is not limited in this embodiment.

Figure 4:
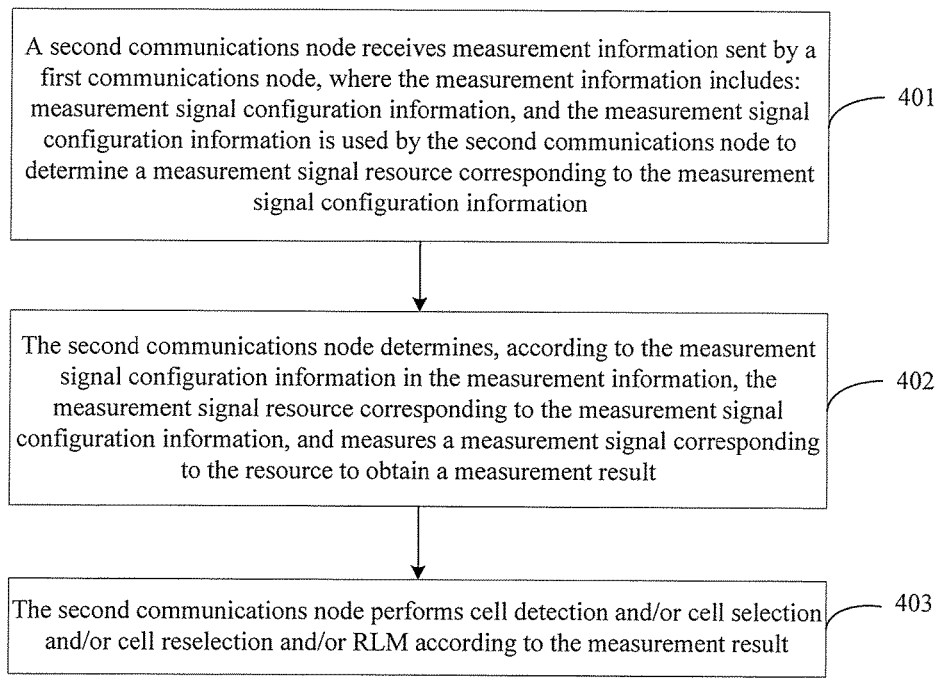
FIG. 4 is another flowchart of a measurement method according to an embodiment of the present invention.

Refer to FIG. 4, which is another flowchart of a measurement method according to an embodiment of the present invention, where the method includes:

Step 401: A second communications node receives measurement information sent by a first communications node, where the measurement information includes: measurement signal configuration information, and the measurement signal configuration information is used by the second communications node to determine a measurement signal resource corresponding to the measurement signal configuration information.

In an embodiment, the first communications node may be a base station, and the second communications node may be a UE.

In another embodiment, both the first communications node and the second communications node may be UEs. In this case, a UE serving as the first communications node may configure measurement information for another UE (that is, the second communications node), and send the configured measurement information to the second communications node.

In another embodiment, both the first communications node and the second communications node may be base stations, and in this case, a base station serving as the second communications node integrates a measurement function of a UE.

Step 402: The second communications node determines, according to the measurement signal configuration information in the measurement information, the measurement signal resource corresponding to the measurement signal configuration information, and measures a measurement signal corresponding to the resource to obtain a measurement result.

In this step, after receiving the measurement information, the second communications node may determine, according to the measurement information, a measurement signal resource to be measured, such as a position or a carrier; and then, measures the measurement signal corresponding to the resource.

That is, after receiving the measurement information sent by the first communications node (for example, a base station), the second communications node (for example, a UE or a base station integrating a function of a UE) may distinguish, according to a difference of RS configuration information of measured cell and/or configuration identities (for example, antenna port information or a configuration index number of CSI-RS/DRS configuration information) of the measured cells in the measurement configuration information in the measurement information, different measured cells indicated by a same physical cell identity, and perform a measurement operation.

The second communications node may perform the measurement on a corresponding measured cell by using signaling configuration information of the measured cell, to obtain a measurement result of the measured cell, such as DRS-RSRP and/or DRS-RSRQ of the measured cell. Optionally, the second communications node may bind the measurement result with at least one of signal configuration information in the measurement signal configuration information, a configuration identity of the measured cell, and a measurement index number. In a practical application, the second communications node may periodically measure the measured cell, and report a measurement result of the measured cell.

If the measurement information received by the second communications node includes measurement indication information such as m-RSRP measurement indication information and/or m-RSRQ measurement indication information, the second communications node may obtain, according to the measurement indication information, a measurement value required by the first communications node, and report the measurement value to the first communications node as the measurement result. For example, if the measurement information sent by the first communications node includes D-RSRP measurement indication information, the second communications node obtains the D-RSRP of the measured cell; and if the measurement information sent by the first communications node includes D-RSRQ measurement indication information, the second communications node obtains the D-RSRQ of the measured cell.

Step 403: The second communications node performs cell detection and/or cell selection and/or cell reselection and/or RLM according to the measurement result.

In the embodiment of the present invention, the second communications node performs measurement on a corresponding measurement signal according to the measurement signal configuration information in the received measurement information, and performs, according to a measurement result, management such as cell detection and/or cell selection and/or cell reselection and/or RLM on a cell corresponding to the measurement signal.

The embodiment of the present invention further provides a cell measurement method, and the method includes:

sending, by the first communications node, discovery reference signal (DRS) signaling to the second communications node, so that the second communications node discovers and/or measures the first communications node by using the signaling; where:

DRS positions and patterns of all cells controlled by the first communications node are fixed; or a DRS position and a pattern of each specific cell controlled by the first communications node are fixed, but DRS positions and corresponding patterns of different cells may be the same or different; that is, a DRS position and a corresponding pattern of one cell may be the same as or different from a DRS position and a corresponding pattern of another cell, which is not limited in this embodiment; or a DRS position and a pattern of each specific cell controlled by the first communications node are configurable; that is, the DRS position and pattern of each cell may be flexibly configured according to an actual requirement; or DRS resources of each of cells controlled by the first communications node are classified into two types: one is a fixed subset, where the cells have a same fixed subset, and the other is a flexible subset, where any two of the cells have different flexible subsets.

A DRS resource of the fixed subset is used by the second communications node to perform cell discovery and/or measurement in a cell selection stage; and a DRS resource of the flexible subset is used by the second communications node to perform cell measurement and/or time-frequency tracking after the second communications node reads a broadcast message or receives dedicated signaling.

Optionally, based on the foregoing embodiment, in another embodiment, the discovery reference signal (DRS) signaling is further used by the second communications node to synchronize with the first communications node by using the signaling, where:

a physical sequence of the discovery reference signal (DRS) signaling and/or a position of the DRS signaling on a radio resource is different from that in a synchronization channel.

In this embodiment, the first communications node is, for example, a UE, and the second communications node is, for example, a base station, but the present invention is not limited thereto. In this embodiment, the UE sends new downlink DRS signaling to the base station, where the physical sequence of the signaling and/or the position of the signaling on the radio resource may be different from that of a current SS; and the signaling specifically includes:

1) only DRS signaling; or

2) DRS, and a CRS with a period being 5 ms (reuse 5 ms CRS).

Certainly, the DRS may also include an SS function, which is not limited in this embodiment.

In one embodiment, DRS positions and patterns of all cells controlled by the first communications node are fixed; or in another embodiment, a DRS position and a pattern of each cell controlled by the first communications node are fixed, and may be different in different cells.

In another embodiment, a DRS position and a pattern (including a DRS distribution pattern in a unit subframe, and a transmission pattern among the subframes, for example, in a period of 400 ms, subframes in which the DRS is sent and subframes in which the DRS is not sent) of each cell controlled by the first communications node are flexible and configurable, for example, the position of the subframe/PRB, a sending period of the DRS, a pattern of the DRS, and a density of the DRS in a certain subframe.

In this embodiment, the DRS resource may be of a cell level and may also be of a UE level, which is not limited in this embodiment.

In another embodiment, the DRS resource is classified into two types: one is a fixed subset, all the cells have a same fixed subset; and the other is a flexible subset, any two of all the cells have different flexible subsets.

The reason is that, in an initial cell selection stage of a UE, because no a prior information exists, the fixed-subset DRS resource is used to perform cell discovery and measurement; after the UE reads the broadcast message, the fixed-subset resource and the flexible-subset resource can be used to perform cell measurement and time-frequency tracking.

Figure 5A:
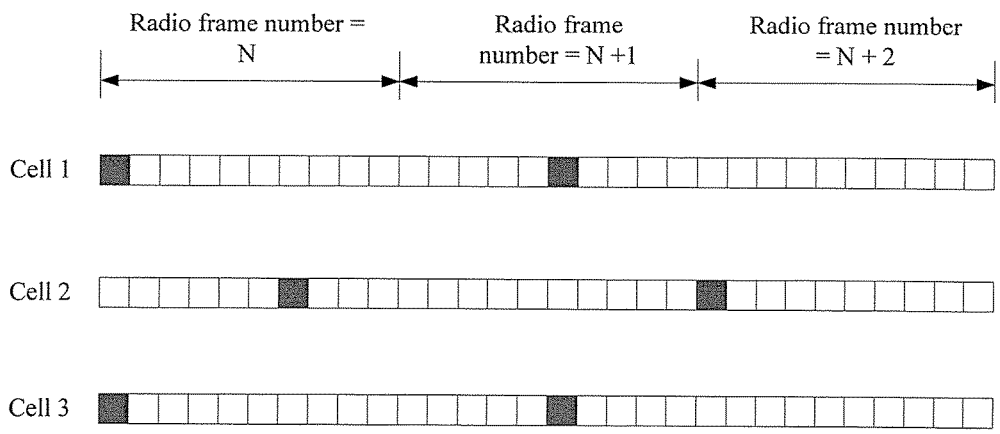
FIG. 5A is a schematic diagram showing that only DRS signaling is sent according to an embodiment of the present invention.

A schematic diagram showing that only one kind of DRS signaling is sent and a schematic diagram showing that multiple types of signaling are sent are shown in FIG. 5A and FIG. 5B respectively. FIG. 5A is a schematic diagram showing that only DRS signaling is sent according to an embodiment of the present invention, and FIG. 5B is a schematic diagram showing that multiple types of signaling are sent and coexist according to an embodiment of the present invention.

In FIG. 5A, it indicates that only the DRS is sent by the cell and can be used for cell discovery/measurement, subframe positions in which the DRS is sent are the same in a cell 1 and a cell 3, and subframe positions in which the DRS is sent are different in the cell 1 and a cell 2.

In FIG. 5B, it indicates that the SS, DRS, CRS, and CSI-RS are sent by the cell and can be used for cell discovery/measurement, subframe positions in which the DRS is sent are the same in a cell 1 and a cell 2, and subframe positions in which the DRS is sent are different in a cell 1 and a cell 3. However, the present invention is not limited thereto, and the foregoing description is only used as examples in this embodiment.

In the embodiment of the present invention, the first communications node sends discovery reference signal (DRS) signaling to the second communications node, so that the second communications node uses the signaling to discover and/or measure the first communications node, so as to manage the first communications node.

Refer to FIG. 6, which is a flowchart of a cell measurement method according to an embodiment of the present invention, where the method includes:

Step 601: A second communications node receives discovery reference signal (DRS) signaling sent by a first communications node, where the signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets.

A DRS resource of the fixed subset is used to instruct the second communications node to perform cell discovery and/or measurement in a cell selection stage; and a DRS resource of the flexible subset is used to instruct the second communications node to perform cell measurement and/or time-frequency tracking after the second communications node reads a broadcast message or receives dedicated signaling.

Step 602: The second communications node discovers and/or measures the first communications node by using the signaling.

Optionally, the DRS signaling is further used to instruct the second communications node to synchronize with the first communications node by using the signaling, where a physical sequence of the discovery reference signal (DRS) signaling and/or a position of the DRS signaling on a radio resource is different from that in a synchronization channel In the embodiment of the present invention, after receiving the discovery reference signal (DRS) signaling sent by the first communications node, the second communications node discovers and/or measures the first communications node by using the signaling, so as to manage the first communications node.

Figure 7:
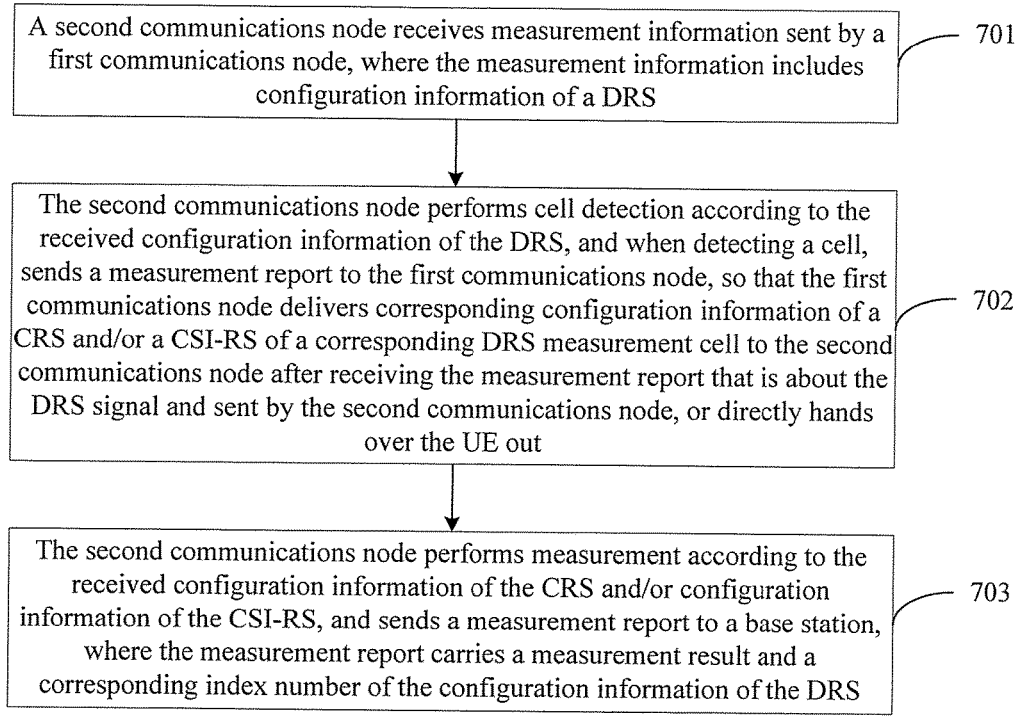
FIG. 7 is another flowchart of a cell measurement method according to an embodiment of the present invention.

Refer to FIG. 7, which is another flowchart of a cell measurement method according to an embodiment of the present invention, where the method includes:

Step 701: A second communications node receives measurement information sent by a first communications node, where the measurement information includes configuration information of a DRS.

The first communications node receives a measurement report sent by the second communications node, where the measurement report carries a measurement result of measurement performed by the second communications node according to the measurement information.

The measurement information may be sent by the first communications node to the second communications node by using dedicated signaling, and may also be sent by using a system message. Information in the measurement information includes measurement information of a cell/frequency of the first communications node, and may further include measurement information of another neighboring cell/frequency.

The measurement information is used by the second communications node to detect a cell corresponding to the measurement information; or the measurement information is used by the second communications node to detect a cell corresponding to the measurement information, and further measure the cell corresponding to the measurement information; or the measurement information is used by the second communications node to measure a cell corresponding to the measurement information.

Step 702: The second communications node performs cell detection according to the received configuration information of the DRS, and when detecting a cell, sends a measurement report to the first communications node, so that the first communications node delivers corresponding configuration information of a CRS and/or a CSI-RS of a corresponding DRS measurement cell to the second communications node after receiving the measurement report that is about the DRS and sent by the second communications node, or directly hands over the UE out.

The measurement report carries at least one of the following: a measurement result and a corresponding index number of the configuration information of the DRS; and may further include neighboring cell identity information.

Step 703: The second communications node performs measurement according to the received configuration information of the CRS and/or configuration information of the CSI-RS, and sends a measurement report to a base station, where the measurement report carries a measurement result and a corresponding index number of the configuration information of the DRS.

Figure 8:
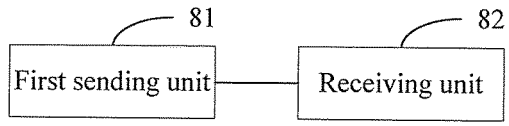
FIG. 8 is a schematic structural diagram of a measurement apparatus according to an embodiment of the present invention.

Based on the implementation process of the foregoing method, the embodiment of the present invention further provides a measurement apparatus, of which a schematic structural diagram is shown in FIG. 8. The apparatus is located in the first communications node. The apparatus includes: a first sending unit 81 and a receiving unit 82, where the first sending unit 81 is configured to send measurement information to the second communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a measurement signal resource corresponding to the configuration information of the measurement signal combination.

The receiving unit 82 is configured to receive a measurement report sent by the second communications node, where the measurement report carries a measurement result of measurement performed by the second communications node according to the measurement information.

Optionally, the measurement signal sent by the first sending unit is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

Optionally, in the foregoing embodiment, the measurement signal configuration information sent by the first sending unit includes at least one of the following: frequency domain resource configuration information, code domain resource configuration information, subframe configuration information, space domain information, and pattern information on a unit resource.

Optionally, in the foregoing embodiment, the measurement signal configuration information sent by the first sending unit includes: configuration information of a DRS.

Optionally, in the foregoing embodiment, the measurement information sent by the first sending unit further includes: a mapping relationship between the configuration information of the DRS and a CSI-RS.

Optionally, in the foregoing embodiment, the configuration information of the DRS sent by the first sending unit includes at least one of the following: antenna port information, frequency domain resource configuration information, code domain resource configuration information, subframe configuration information, pattern information on a unit resource, and a ratio of transmit power of a physical downlink shared channel (PDSCH) to that of the DRS. For definitions of the frequency domain resource configuration information, the code domain resource configuration information, the subframe configuration information, and the pattern information on the unit resource, refer to the foregoing description. Therefore, no further details are repeated herein.

Optionally, in the foregoing embodiment, the subframe configuration information in the configuration information of the DRS sent by the first sending unit includes: subframe shift information and period information.

Optionally, in the foregoing embodiment, the configuration information of the DRS sent by the first sending unit further includes: synchronization information, where the synchronization information includes at least one of the following: a radio frame number shift, a subframe shift, and a time symbol shift.

Optionally, in the foregoing embodiment, the measurement signal configuration information sent by the first sending unit includes: configuration information of a CRS sent in the partial subframe, and the configuration information of the CRS sent in the partial subframe includes at least one of the following: frequency domain resource configuration information, subframe configuration information, and pattern information on a unit resource, where the subframe configuration information includes: subframe shift information and period information.

Optionally, in the foregoing embodiment, the measurement information sent by the first sending unit includes: a neighboring cell identity.

Optionally, in the foregoing embodiment, the measurement information sent by the first sending unit includes: a measurement signal type.

Optionally, in the foregoing embodiment, the measurement signal type in the measurement information sent by the first sending unit includes: CRS whole-set measurement, CRS restricted measurement, CSI-RS measurement, DRS measurement, CRS and DRS hybrid measurement, CSI-RS and DRS hybrid measurement, CRS and CSI-RS hybrid measurement, and DRS, CRS and, CSI-RS hybrid measurement.

Optionally, in the foregoing embodiment, the measurement information sent by the first sending unit further includes: measurement type configuration information.

Optionally, in the foregoing embodiment, if the measurement report received by the receiving unit carries a measurement result, corresponding to a DRS resource, of measurement performed by using a DRS, and after the receiving unit receives the measurement report sent by the second communications node, the apparatus may further include: a third sending unit, configured to send the configuration information of a CRS and/or configuration information of a CSI-RS to the second communications node.

Optionally, in the foregoing embodiment, the measurement information sent by the first sending unit further includes: report configuration information, which is used to indicate a manner of sending the measurement report by the second communications node.

Optionally, in the foregoing embodiment, the report configuration information sent by the first sending unit includes:

a period value of reporting the measurement result by the second communications node from a bottom layer to a higher layer; or a quantity value of measurement signals in the measurement result reported by the second communications node from a bottom layer to a higher layer, where the report configuration information includes the period value of reporting measurement by the second communications node from the bottom layer to the higher layer. Optionally, the period value is determined by the apparatus according to sending precision and a transmission period of the measurement signal.

Optionally, in the foregoing embodiment, the measurement signal configuration information sent by the first sending unit may further include at least one set of configuration information of a GAP, where the configuration information of the GAP includes: a period of starting the GAP, an initial position, and length of one or more GAPs; or the configuration information of the GAP includes pattern information of GAP configuration; or the configuration information of the GAP includes a quantity value of measurement signals to be measured.

Optionally, in the foregoing embodiment, the configuration information of the GAP in the measurement signal configuration information sent by the first sending unit includes at least one of the following: a measurement signal type corresponding to each set of configuration information of the GAP, and frequency and/or system information corresponding to each set of configuration information of the GAP.

For the implementation process of functions and purposes of the units of the apparatus, refer to the corresponding implementation process in the foregoing method. Therefore, no further details is repeated herein.

Figure 9:
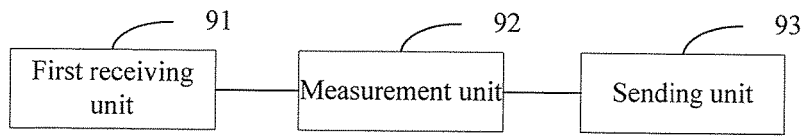
FIG. 9 is another schematic structural diagram of a measurement apparatus according to an embodiment of the present invention.

Refer to FIG. 9, which is another schematic structural diagram of a measurement apparatus according to an embodiment of the present invention. The apparatus includes: a first receiving unit 91, a measurement unit 92, and a sending unit 93. The first receiving unit 91 is configured to receive measurement information sent by a first communications node, where the measurement information includes measurement signal configuration information and/or configuration information of a measurement signal combination, the measurement signal configuration information is used by the second communications node to determine a measurement signal resource corresponding to the measurement signal configuration information, and the configuration information of the measurement signal combination is used by the second communications node to determine a resource of a measurement signal corresponding to the configuration information of the measurement signal combination.

The measurement unit 92 is configured to determine, according to the measurement signal configuration information in the measurement information, the measurement signal resource corresponding to the measurement signal configuration information, and/or determine, according to the configuration information of the measurement signal combination in the measurement information, the measurement signal resource corresponding to the configuration information of the measurement signal combination; and measure the measurement signal corresponding to the resource to obtain a measurement result. The sending unit 93 is configured to send the measurement result to the first communications node.

Optionally, in the foregoing embodiment, the apparatus may further include: the measurement signal received by the first receiving unit is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

For the implementation process of functions and purposes of the units of the apparatus, refer to the corresponding implementation process of steps in the foregoing method. Therefore, no further details is repeated herein.

Figure 10:
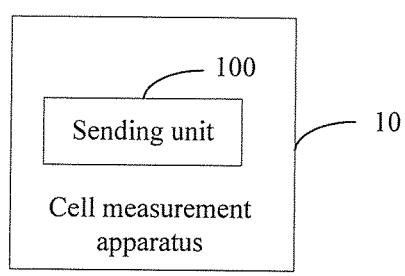
FIG. 10 is a schematic structural diagram of a cell measurement apparatus according to an embodiment of the present invention.

Refer to FIG. 10, which is a schematic structural diagram of a cell measurement apparatus according to an embodiment of the present invention. The cell measurement apparatus 10 is located in a first communications node, and includes a sending unit 100. The sending unit 100 is configured to send discovery reference signal (DRS) signaling to a second communications node, so that the second communications node discovers and/or measures the first communications node by using the signaling, where the DRS signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets.

Optionally, the DRS signaling sent by the sending unit is further used to instruct the second communications node to synchronize with the first communications node by using the signaling, where a physical sequence of the discovery reference signal (DRS) signaling and/or a position of the DRS signaling on a radio resource is different from that in a synchronization channel.

A DRS resource of the fixed subset is used to instruct the second communications node to perform cell discovery and/or measurement in a cell selection stage; and a DRS resource of the flexible subset is used to instruct the second communications node to perform cell measurement and/or time-frequency tracking after the second communications node reads a broadcast message or receives dedicated signaling.

For the implementation process of functions and purposes of the units of the apparatus, refer to the corresponding implementation process in the foregoing method. Therefore, no further details is repeated herein.

Figure 11:
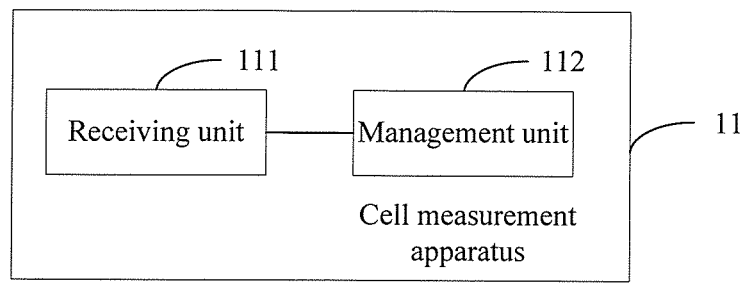
FIG. 11 is another schematic structural diagram of a cell measurement apparatus according to an embodiment of the present invention.

Refer to FIG. 11, which is another schematic structural diagram of a cell measurement apparatus according to an embodiment of the present invention. The cell measurement apparatus 11 is located in a second communications node, and includes a receiving unit 111 and a management unit 112. The receiving unit 111 is configured to receive discovery reference signal (DRS) signaling sent by a first communications node, where the signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS position and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets.

The management unit 112 is configured to enable the second communications node to discover and/or measure the first communications node by using the signaling.

Optionally, the DRS signaling received by the receiving unit is further used to instruct the second communications node to synchronize with the first communications node by using the signaling, where a physical sequence of the discovery reference signal (DRS) signaling and/or a position of the DRS signaling on a radio resource is different from that in a synchronization channel.

For the implementation process of functions and purposes of the units of the apparatus, refer to the corresponding implementation process in the foregoing method. Therefore, no further details are repeated herein.

Figure 12:
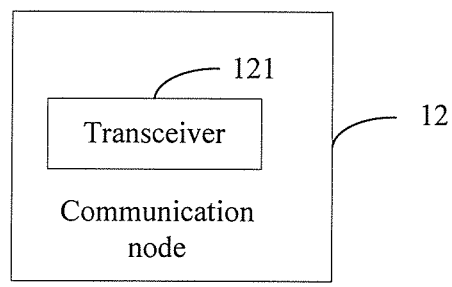
FIG. 12 is a schematic structural diagram of a communications node according to an embodiment of the present invention.

Refer to FIG. 12, which is a schematic structural diagram of a communications node according to an embodiment of the present invention. The communications node 12 includes a transceiver 121. The transceiver 121 is configured to send measurement information to a transceiver of a second communications node, where the measurement information includes measurement signal configuration information, and the measurement signal configuration information is used by the second communications node to determine a measurement signal resource corresponding to the measurement signal configuration information, and receive a measurement report sent by the transceiver of the second communications node, where the measurement report carries a measurement result of measurement performed by the second communications node according to the measurement information.

In this embodiment, the second communications node may be a communications node other than this communications node, and may also be other multiple communications nodes, which is not limited in this embodiment.

Optionally, the transceiver is further configured to send the measurement signal or a measurement signal combination to the transceiver of the second communications node, where the measurement signal or the measurement signal combination is a signal for instructing the second communications node to perform measurement, the measurement signal is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

For the implementation process of functions and purposes of the transceiver of the communications node, refer to the corresponding implementation process in the foregoing method. Therefore, no further details is repeated herein.

Figure 13:
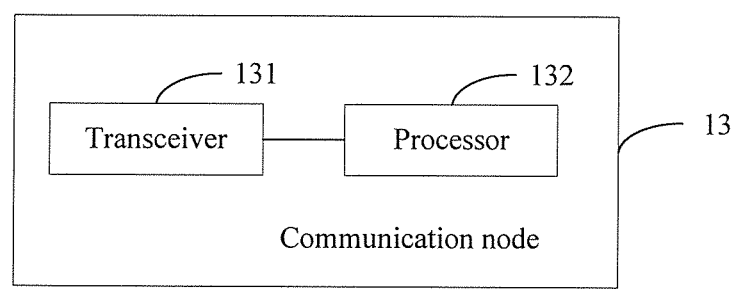
FIG. 13 is another schematic structural diagram of a communications node according to an embodiment of the present invention.

Refer to FIG. 13, which is another schematic structural diagram of a communications node according to an embodiment of the present invention. The communications node 13 includes: a transceiver 131 and a processor 132. The transceiver 131 is configured to receive measurement information sent by a transceiver of a first communications node, where the measurement information includes measurement signal configuration information, and the measurement signal configuration information is used by the second communications node to determine a measurement signal resource corresponding to the measurement signal configuration information. The processor 132 is configured to determine, according to the measurement information received by the transceiver, the measurement signal resource corresponding to the measurement signal configuration information, and measure the measurement signal corresponding to the resource to obtain a measurement result.

The transceiver 131 is further configured to send the measurement result to the transceiver of the first communications node.

In this embodiment, the first communications node may be a communications node other than this communications node, and may also be other multiple communications nodes, which is not limited in this embodiment.

Optionally, the transceiver is further configured to receive the measurement signal or a measurement signal combination sent by the transceiver of the first communications node, where the measurement signal or the measurement signal combination is a signal for instructing the second communications node to perform measurement, the measurement signal is a discovery reference signal (DRS), and the measurement signal combination is a combination of a DRS and at least one of a cell-specific reference signal (CRS) sent in a full subframe, a CRS sent in a partial subframe, a synchronization signal (SS), and a channel state information reference signal (CSI-RS), or a combination of at least two of a CRS sent in a full subframe, a CRS sent in a partial subframe, an SS, and a CSI-RS.

For the implementation process of functions and purposes of the transceiver of the communications node, refer to the corresponding implementation process in the foregoing method. Therefore, no further details are repeated herein.

The embodiment of the present invention further provides a communications node, and the communications node includes a transceiver, configured to send discovery reference signal (DRS) signaling to a second communications node, so that the second communications node discovers and/or measures the communications node by using the signaling, where the DRS signaling is used to indicate that DRS positions and patterns of all cells controlled by the communications node are fixed; or used to indicate that a DRS position and a corresponding pattern of each cell controlled by the communications node are fixed, where DRS positions and corresponding patterns of different cells are the same or different; or used to indicate that a DRS position and a pattern of each cell controlled by the communications node are configurable; or used to indicate that DRS resources of each of cells controlled by the communications node are classified into two types: one is a fixed subset, where the cells have a same fixed subset, and the other is a flexible subset, where any two of the cells have different flexible subsets.

Optionally, the DRS signaling sent by the transceiver is further used to instruct the second communications node to synchronize with the communications node by using the signaling, where a physical sequence of the discovery reference signal (DRS) signaling and/or a position of the DRS signaling on a radio resource is different from that in a synchronization channel.

For the implementation process of functions and purposes of the transceiver of the communications node, refer to the corresponding implementation process in the foregoing method. Therefore, no further details is repeated herein.

The embodiment of the present invention further provides a communications node, and the communications node includes a transceiver and a processor. The transceiver is configured to receive discovery reference signal (DRS) signaling sent by a first communications node, where the signaling is used to indicate that DRS positions and patterns of all cells controlled by the first communications node are fixed; or used to indicate that a DRS position and a corresponding pattern of each cell controlled by the first communications node are fixed, where DRS positions and corresponding patterns of different cells are the same or different; or used to indicate that a DRS positions and a pattern of each cell controlled by the first communications node are configurable; or used to indicate that DRS resources of each of cells controlled by the first communications node are classified into two types: one is a fixed subset, where the cells have a same fixed subset, and the other is a flexible subset, where any two of the cells have different flexible subsets. The processor is configured to discover and/or measure the first communications node by using the signaling.

Optionally, the DRS signaling received by the transceiver is further used to instruct the second communications node to synchronize with the first communications node by using the signaling, where:

a physical sequence of the discovery reference signal (DRS) signaling and/or a position of the DRS signaling on a radio resource is different from that in a synchronization channel.

For the implementation process of functions and purposes of the transceiver of the communications node, refer to the corresponding implementation process in the foregoing method. Therefore, no further details are repeated herein.

The embodiment of the present invention prevents a conventional UE or an earlier release of UE from residing in an NCT cell during cell selection/reselection/reestablishment, so as to avoid increase of a delay, and save the electrical energy of the UE, so that increase the gain to the system brought by an enhanced cell, thereby further improving user experience.

For ease of understanding of a person skilled in the art, the present invention is described below by using a specific application example.

Application Example 1

Figure 14:
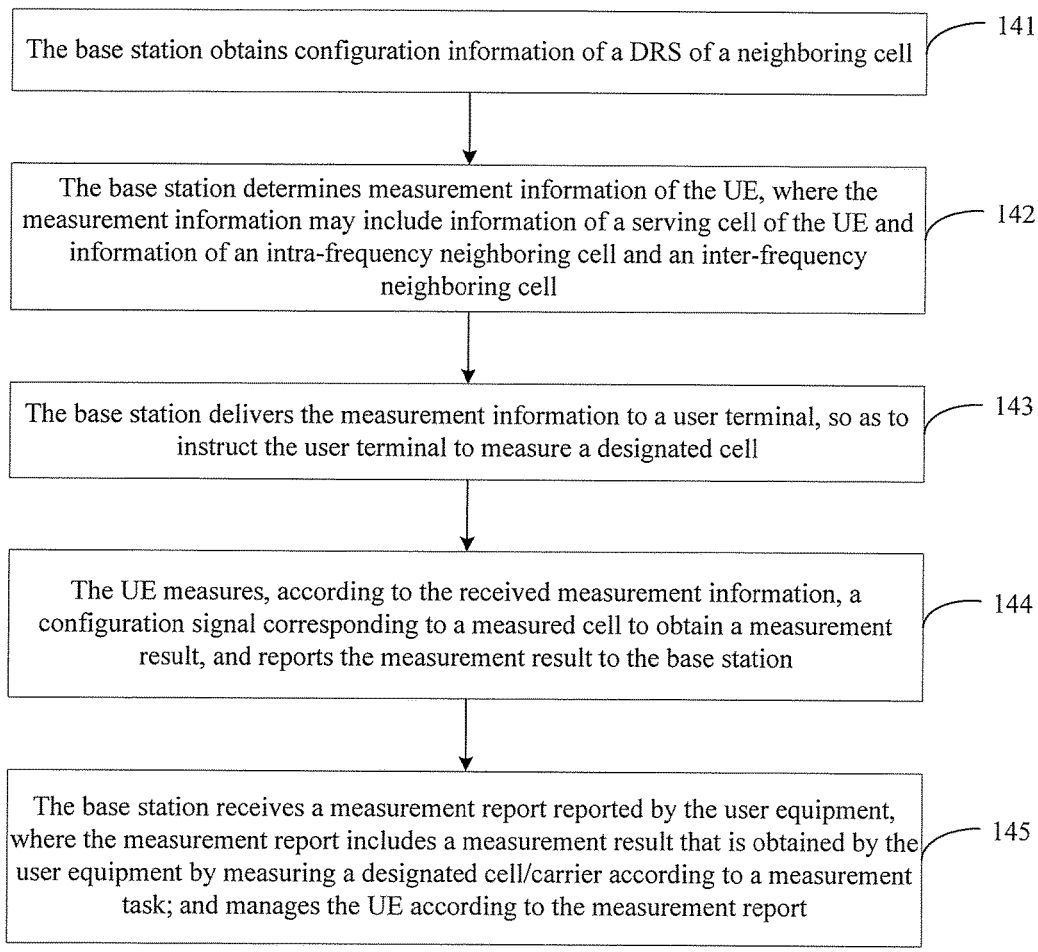
FIG. 14 is a flowchart of an application example of a measurement method according to an embodiment of the present invention.

Refer to FIG. 14, which is a flowchart of an application example of a measurement method according to an embodiment of the present invention. In this embodiment, an enhanced cell may be a cell having an enhanced function, or a cell on a new-type carrier, or a new-type carrier, which is not limited in this embodiment. In this embodiment, a first communications node is, for example, a base station, and a second communications node is, for example, a UE, but the present invention is not limited thereto. The method includes:

Step 141: The base station obtains configuration information of a DRS of a neighboring cell.

The configuration information of the DRS of the neighboring cell may be obtained through an X2 interface, or another interface (for example, a wireless interface) between the two base stations, or by means of OAM, where the configuration information of the DRS is described as above, and therefore no further details is repeated herein.

Specifically, during setup of an interface between base stations, a base station and a neighboring base station exchange, by receiving a carrier type that is of a designated carrier of the neighboring base station and sent by the neighboring base station, cell information of respective cells under the coverage of the base station and the neighboring base station, where the cell information includes information such as a carrier frequency band, a carrier type, a cell identity (ID), and measurement signaling configuration of a cell.

This embodiment is described below by using an example where a connection is set up between a base station 1 and a base station 2 through an X2 interface.

The base station 2 sends an X2 interface setup request (X2 setup request) message to the base station 1, where the request message carries cell information of a cell and a neighboring cell that are under the coverage of the base station 2.

The base station 1 sends an X2 interface setup response (X2 setup response) message to the base station 2, where the response message carries cell information of a cell and a neighboring cell that are under the coverage of the base station 1.

In another aspect, when establishing a connection, through an S1 interface, the base station 1 and the base station 2 may perform signaling interaction through a mobility management entity (MME), so that the base station 1 and the base station 2 obtain cell information of respective cells under the coverage of the base station and the neighboring base station.

Step 141 is an optional step.

Step 142: The base station determines measurement information of the UE, where the measurement information may include information of a serving cell of the UE and information of an intra-frequency neighboring cell and an inter-frequency neighboring cell. For example, the measurement information includes a type (a common carrier or a carrier of a new carrier type) of a carrier where a cell is located, measurement information (including measurement configuration information), and the like.

The common carrier in the embodiment of the present invention is a conventional backward-compatible carrier; and the new-type carrier is an enhanced non-backward-compatible carrier, which may be a new carrier type NCT, that is, a new carrier type proposed in Release-11 by the 3GPP. The NCT is considered to be a non-backward-compatible carrier, and an existing mechanism may be modified to enhance performance of the carrier, for example, enhancing spectral efficiency, improving supporting and energy-saving of a heterogeneous network, or the like.

To achieve the foregoing performance improvement, the measurement information provided to the UE in the embodiment of the present invention may include: a DRS, used for cell discovery and/or measurement; an SS (including a PSS/SSS), used for cell discovery, where the signaling is optional; a CSI-RS, mainly used for reporting of a CSI value, so that the UE performs cell discovery and/or measurement by using the foregoing information.

Step 143: The base station delivers the measurement information to a user terminal, so as to instruct the user terminal to measure a designated cell.

In the embodiment of the present invention, the base station may deliver a measurement task (that is, measurement information) to the user equipment by using a radio resource control (RRC) message, but the present invention is not limited thereto.

Each measurement task includes: measurement object information and report configuration information, where the measurement object information is used to indicate a designated cell/carrier that needs to be measured by the UE, and the report configuration information is used to determine configuration information for triggering the UE to send a measurement report to the base station. The measurement object information and the report configuration information are information element messages in the measurement task, and the base station may preferably add reference signal indication information in the measurement object information or the report configuration information, which is not limited herein.

The measurement object information includes a combination of at least one of the following: a neighboring cell identity, measurement type configuration information, measurement signaling configuration information, and report configuration information.

The conventional cell configuration sent by the base station to the UE is CRS/CSI-RS-based conventional measurement configuration; and the base station configures a new measurement manner for an enhanced cell.

The neighboring cell identity (not required in a case of RLM measurement or CSI reporting measurement) is a combination of at least one of a PCI, a DRS (set) identity, and a CSI-RS (set) identity.

A new measurement manner is as follows: if the measurement task includes RRM measurement, the UE performs measurement by using a DRS; if the measurement task includes CSI reporting measurement, the UE performs measurement by using a CSI-RS; and if the measurement task includes RLM measurement, the UE performs measurement by using a DRS or a CSI-RS.

Measurement signaling configuration information includes: configuration information of a DRS, where the configuration information of the DRS includes antenna port information (where the antenna port information may be an antenna quantity and/or an antenna port number), frequency domain resource configuration information, code domain resource configuration information, subframe configuration information (including subframe shift information and period information), and a ratio, assumed by the UE, of transmit power of a PDSCH to that of the DRS. The measurement information may further include: synchronization information of a measured cell, such as an SFN shift/a subframe shift/a symbol shift. In addition, configuration of the DRS may be a whole-set subframe or a subset of a DRS subframe. When the measured cell has ABS configuration, the UE may perform measurement by using an intersection of a measurement configuration set and a delivered set of the restricted measurement.

Figure 15:
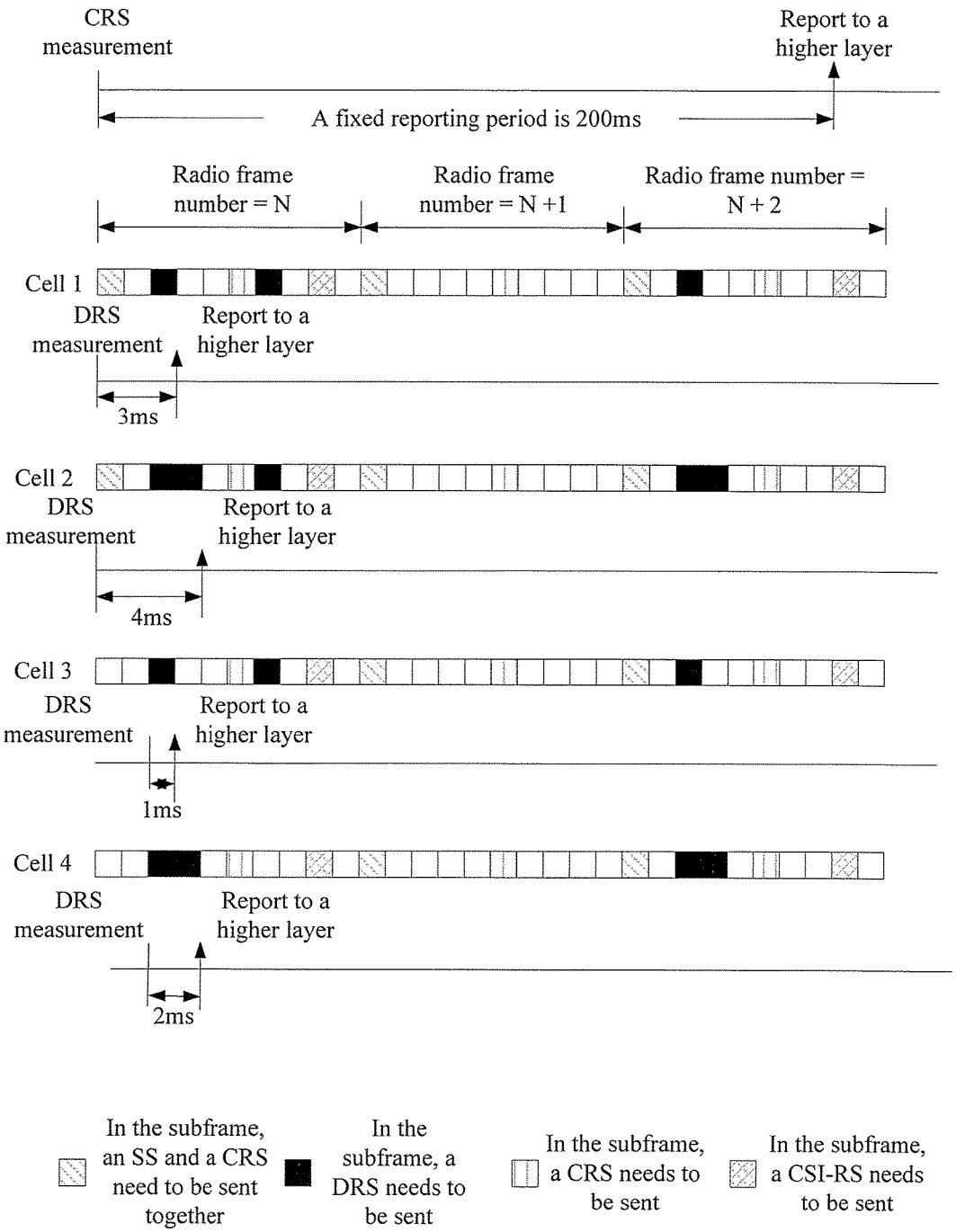
FIG. 15 is schematic diagram showing reporting of a measurement period value according to an embodiment of the present invention.

A period value of measurement reported from a bottom layer to a higher layer is added in report configuration information. Optionally, for this value, precision and a transmission period of the DRS need to be taken into consideration. As shown in FIG. 15, FIG. 15 is a schematic diagram of a period value of reporting measurement according to an embodiment of the present invention.

As shown in FIG. 15, a cell 1 and a cell 2 send DRSs and SSs (synchronization signal), signal density of a DRS in a unit subframe of the cell 1 is higher, measurement performed by using one subframe can meet measurement precision; therefore, a period of reporting the measurement to a higher layer is 3 ms. Signal density of the DRS in a unit subframe of the cell 2 is lower, and measurement performed by using two subframes can meet the measurement precision; therefore, a period of reporting the measurement to the higher layer is 4 ms. DRSs sent by a cell 3 and a cell 4 also have a synchronization signal function, signal density of the DRS in a unit subframe of the cell 3 is higher, and measurement performed by using one subframe can meet the measurement precision; therefore, a period of reporting the measurement to the higher layer is 1 ms. Signal density of the DRS in a unit subframe of the cell 4 is lower, and measurement performed by using two subframes can meet the measurement precision; therefore, a period of reporting the measurement to the higher layer is 2 ms.

In this embodiment, the foregoing measurement configuration message may further include measurement indication information of a measured cell, such as m-RSRP measurement indication information and/or m-RSRQ measurement indication information (m may be a CRS, a CSI-RS, and/or a DRS); the foregoing measurement configuration message may further include measurement reporting manner indication information, used to instruct the UE to perform either periodic measurement reporting or event measurement reporting on the measured cell. If a reporting manner indicated by the measurement reporting manner indication information is event measurement reporting, the measurement information may further include a configuration hysteresis value and hysteresis time, a maximum quantity of measured cells that can be reported and a quantity of reporting times, and/or other auxiliary configuration parameters such as a parameter regarding layer-3 smooth filtering. If a reporting manner indicated by the measurement reporting manner indication information is periodic measurement reporting, the measurement configuration message may further include a configuration report period. Certainly, the foregoing parameters may also be pre-configured in the UE by default, which is not limited in this embodiment.

Step 144: The UE measures, according to the received measurement information, a configuration signal corresponding to a measured cell to obtain a measurement result, and reports the measurement result to the base station.

After receiving the measurement information sent by the base station, the UE may distinguish, according to a difference of RS configuration information of measured cells and/or configuration identities (for example, antenna port information or a configuration index number of CSI-RS/DRS configuration information) of the measured cells in the measurement information, different measured cells indicated by a same physical cell identity, and perform a measurement operation. The UE may measure a corresponding measured cell by using signaling configuration information of the measured cell, to obtain a measurement result of the measured cell, such as DRS-RSRP and/or DRS-RSRQ of the measured cell. Further, the UE may bind the measurement result with at least one of signaling configuration information in the measurement configuration message, a configuration identity of the measured cell, and a measurement index number. In an actual application, the UE may periodically measure the measured cell and report a measurement result of the measured cell. If a measurement configuration message received by the UE includes measurement indication information such as m-RSRP measurement indication information and/or m-RSRQ measurement indication information, the UE may obtain, according to the measurement indication information, a measurement value required by the base station, and report the measurement value to the base station as a measurement result. For example, if the measurement information sent by the base station includes D-RSRP measurement indication information, the UE obtains D-RSRP of the measured cell; and if the measurement information includes D-RSRQ measurement indication information, the UE obtains D-RSRQ of the measured cell.

Step 145: The base station receives a measurement report reported by the user equipment, where the measurement report includes a measurement result that is obtained by the user equipment by measuring a designated cell/carrier according to a measurement task; and manages the UE according to the measurement report.

After obtaining the measurement report, the base station can determine a signal quality and signal strength of the designated cell/carrier according to the measurement result, so that the base station manages the user terminal and the designated cell/carrier. For example, the base station determines whether to add a new carrier for the user terminal, add a cell to a COMP set, or maintain the designated cell/carrier; or determines an inter-cell handover scenario.

Alternatively, after obtaining the measurement report, the base station can determine a signal quality of the UE in a serving cell/carrier (set) according to the measurement result, so that the base station determines a scheduling mechanism for the user terminal.

Figure 16:
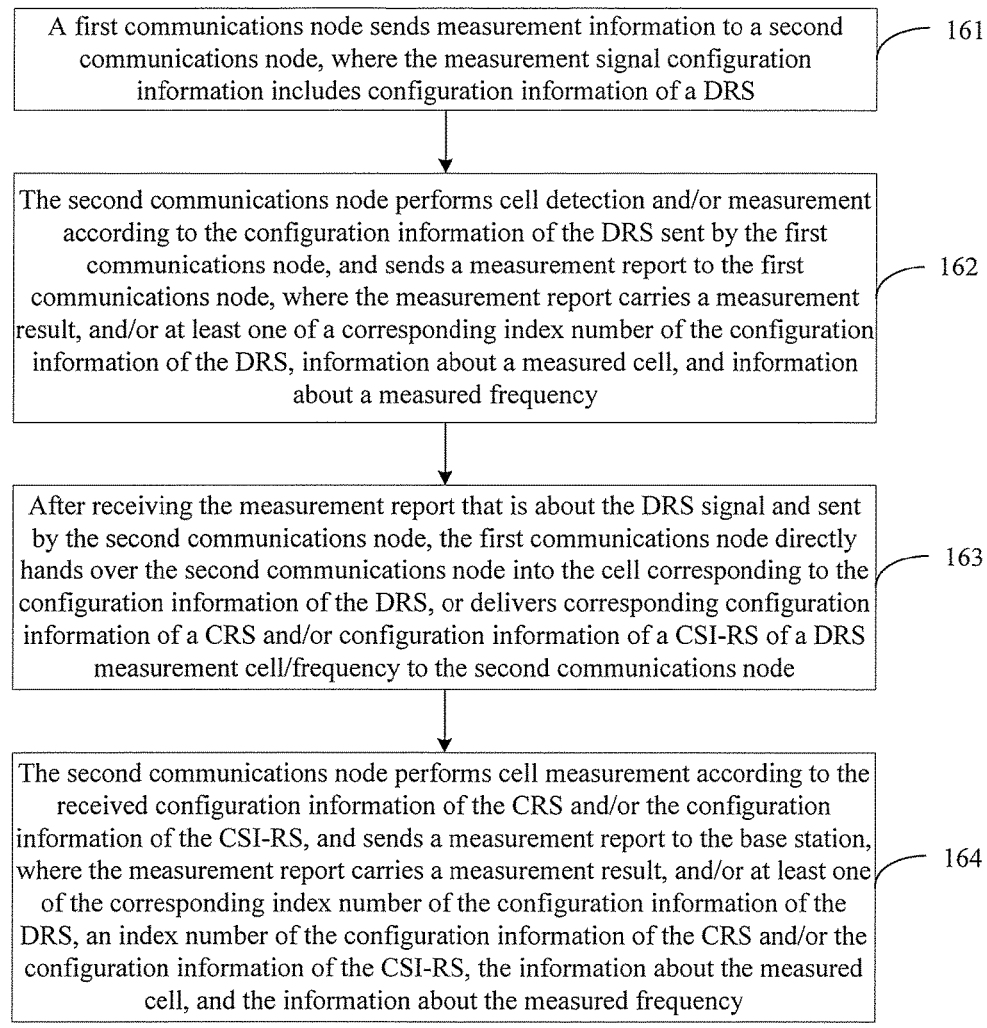
FIG. 16 is another flowchart of a cell measurement method according to an embodiment of the present invention.

Refer to FIG. 16, which is another flowchart of a cell measurement method according to an embodiment of the present invention. The method includes:

Step 161: A first communications node sends measurement information to a second communications node, where the measurement signal configuration information includes configuration information of a DRS.

The configuration information of the DRS includes at least one of the following: a configuration index identity of the DRS, antenna port information (may include an antenna quantity and/or antenna port number), frequency domain resource configuration information, code domain resource configuration information, subframe configuration information, pattern information on a unit resource, and a ratio of transmit power of a physical downlink shared channel (PDSCH) to that of the DRS. The frequency domain resource configuration information, the code domain resource configuration information, the subframe configuration information, and the pattern information on the unit resource are identical to those in the foregoing embodiment, and therefore no further details is repeated herein.

The subframe configuration information may include, but is not limited to, subframe shift information and period information, and may further include other information, which is not limited in this embodiment.

Optionally, the configuration information of the DRS may further include: synchronization information, where the synchronization information includes at least one of the following: a radio frame number shift, a subframe shift, and a time symbol shift.

The configuration information of the DRS may be sent by the first communications node to the second communications node by using dedicated signaling, and may also be sent by using a system message. Information in the configuration information of the DRS includes configuration information of the DRS of a cell/frequency of the first communications node, and may further include configuration information of the DRS of another neighboring cell/frequency.

The configuration information of the DRS is used by the second communications node to detect a cell corresponding to the configuration information of the DRS; or the configuration information of the DRS is used by the second communications node to detect a cell corresponding to the configuration information of the DRS, and further measure the cell corresponding to the configuration information of the DRS; or the configuration information of the DRS is used by the second communications node to measure a cell corresponding to the configuration information of the DRS.

Step 162: The second communications node performs cell detection and/or measurement according to the configuration information of the DRS sent by the first communications node, and sends a measurement report to the first communications node, where the measurement report carries a measurement result, and/or at least one of a corresponding index number of the configuration information of the DRS, information about a measured cell, and information about a measured frequency.

Step 163: After receiving the measurement report that is about the DRS and sent by the second communications node, the first communications node directly hands over the second communications node into the cell corresponding to the configuration information of the DRS, or delivers corresponding configuration information of a CRS and/or configuration information of a CSI-RS of a DRS measurement cell/frequency to the second communications node.

Step 164: The second communications node performs cell measurement according to the received configuration information of the CRS and/or the configuration information of the CSI-RS, and sends a measurement report to the base station, where the measurement report carries a measurement result, and/or at least one of the corresponding index number of the configuration information of the DRS, an index number of the configuration information of the CRS and/or the configuration information of the CSI-RS, the information about the measured cell, and the information about the measured frequency.

In step 163, if the second communications node is directly handed over into the cell corresponding to the configuration information of the DRS, the process ends.

The embodiment of the present invention may be applied in a CoMP communications system, where the communications system includes multiple interconnected access points or transmission points, such as base stations, where these base stations may be macro base stations (Macro eNBs or eNBs), micro base stations (may be Picos, Relays, HeNBs, HNBs, or RRHs), or the like, which is not limited herein. Anyhow, each of the base stations is a site or a transmission point.

In the embodiment of the present invention, an eNB is used as an example to represent a macro base station corresponding to a macro cell, and an RRH is used as an example to represent a micro base station corresponding to a micro cell. Generally, a wireless communications system may include a homogeneous network communications system and a heterogeneous network communications system, where interconnected base stations in the homogeneous network communications system are all macro cell base stations, and interconnected base stations in the heterogeneous network communications system may be a macro cell base station and a micro cell base station. All base stations in the foregoing CoMP communications system together provide services for a terminal, where the terminal generally refers to a UE (user equipment), or may be called a user terminal or a terminal.

In the embodiments of the present invention, a UE may be any one of the following, and may be either static or mobile. A static UE may specifically include a terminal, a mobile station, a subscriber unit, a station, or the like. A mobile UE may specifically include a cellular phone, a personal digital assistant (PDA), a wireless modem, a wireless communications device, a handheld device, a laptop computer, a cordless phone, a wireless local loop (WLL) station, or the like. The UEs may be distributed in a whole wireless network.

It should be noted that, in this document, relational terms such as first and second, and the like may be used solely to distinguish one entity or action from another entity or action without necessarily requiring or implying any actual such relationship or order between such entities or actions. The terms "includes", "including", or any other variation thereof, are intended to cover a non-exclusive inclusion, such that a process, method, article, or device that includes a list of elements does not include those elements only but may include other elements not expressly listed or inherent to such process, method, article, or device. An element preceded by "includes a . . . " does not, without more constraints, preclude the existence of additional identical elements in the process, method, article, or device that includes the element.

According to the foregoing description of the implementation manners, a person skilled in the art may clearly understand that the present invention may be implemented by software plus a necessary universal hardware platform, and definitely may also be implemented by hardware. However, under most circumstances, the former is a preferred implementation manner. Based on such an understanding, the technical solutions of the present invention essentially, or the part contributing to the prior art may be implemented in the form of a software product. The computer software product may be stored in a readable storage medium, for example, a ROM/RAM, a magnetic disk, or an optical disc, and includes several instructions for instructing a computer device (which may be a personal computer, a server, or a network device) to perform the methods described in the embodiments or some parts of the embodiments of the present invention.

Preferred embodiments of the present invention are described above. It should be noted by a person of ordinary skill in the art that modifications and variations may be made without departing from the principle of the present invention, which should be construed as falling within the protection scope of the present invention.

What is claimed is:

1. A measurement method, comprising:
sending, by a first communications node, measurement information comprising configuration information of a measurement signal combination to a second communications node for indicating a measurement signal resource corresponding to the configuration information of the measurement signal combination, wherein the measurement signal combination comprises a synchronization signal (SS), a cell-specific reference signal (CRS) sent in a partial subframe, and a channel state information reference signal (CSI-RS);
receiving, by the first communications node, a measurement report sent by the second communications node, wherein the measurement report carries a measurement result of a measurement performed by the second communications node according to the measurement information; and wherein configuration information of the CRS sent in the partial subframe comprises: frequency domain resource configuration information, subframe configuration information, and pattern information on a unit resource, wherein the subframe configuration information comprises: subframe shift information and period information.

2. A measurement method, comprising:

receiving, by a second communications node, measurement information comprising configuration information of a measurement signal combination sent by a first communications node for indicating a measurement signal resource corresponding to the configuration information of the measurement signal combination, wherein the measurement signal combination comprises a synchronization signal (SS), a cell-specific reference signal (CRS) sent in a partial subframe, and a channel state information reference signal (CSI-RS);

determining, by the second communications node according to the received configuration information of the measurement signal combination, the measurement signal resource corresponding to the configuration information of the measurement signal combination;

measuring, by the second communications node, a measurement signal corresponding to the measurement signal resource to obtain a measurement result; and sending, by the second communications node, the measurement result to the first communications node;

wherein configuration information of the CRS sent in the partial subframe comprises: frequency domain resource configuration information, subframe configuration information, and pattern information on a unit resource, wherein the subframe configuration information comprises: subframe shift information and period information.

3. A device, applied to a first communications node, comprising a processor and a non-transitory computer readable storage medium, wherein the non-transitory computer readable storage medium stores a program that, when executed by the processor, causes the device to:

send measurement information comprising configuration information of a measurement signal combination to a second communications node for indicating a measurement signal resource corresponding to the configuration information of the measurement signal combination, wherein the measurement signal combination comprises a synchronization signal (SS), a cell-specific reference signal (CRS) sent in a partial subframe, and a channel state information reference signal (CSI-RS); and receive a measurement report sent by the second communications node, wherein the measurement report carries a measurement result of a measurement performed by the second communications node according to the measurement information;

wherein configuration information of the CRS sent in the partial subframe comprises: frequency domain resource configuration information, subframe configuration information, and pattern information on a unit resource, wherein the subframe configuration information comprises: subframe shift information and period information.

4. The device according to claim 3, wherein the measurement information further comprises:

a neighboring cell identity or identity information of a third communications node, wherein the third communications node is adjacent to the first communications node.

5. The device according to claim 3, wherein the measurement information further comprises:

a measurement signal type.

6. The device according to claim 5, wherein the measurement signal type comprises at least one of the following:

a CRS whole-set measurement, a CRS restricted measurement, a CSI-RS measurement, or a CRS and CSI-RS hybrid measurement.

7. The device according to claim 3, wherein the measurement information further comprises:

measurement type configuration information.

8. The device according to claim 3, wherein the measurement information further comprises:

report configuration information to indicate a manner of sending the measurement report by the second communications node.

9. The device according to claim 8, wherein the report configuration information comprises:

a period value of reporting the measurement result by the second communications node from a bottom layer to a higher layer; or a quantity value of measurement signals in the measurement result reported by the second communications node from a bottom layer to a higher layer.

10. A device, applied to a second communications node, comprising a processor and a non-transitory computer readable storage medium, wherein the non-transitory computer readable storage medium stores a program that, when executed by the processor, causes the device to:

receive, from a first communications node, measurement information comprising configuration information of a measurement signal combination for indicating a measurement signal resource corresponding to the configuration information of the measurement signal combination, wherein the measurement signal combination comprises a synchronization signal (SS), a cell-specific reference signal (CRS) sent in a partial subframe, and a channel state information reference signal (CSI-RS);

determine, according to the received configuration information of the measurement signal combination, the measurement signal resource corresponding to the configuration information of the measurement signal combination;

measure a measurement signal corresponding to the measurement signal resource to obtain a measurement result; and send the measurement result to the first communications node;

wherein configuration information of the CRS sent in the partial subframe comprises: frequency domain resource configuration information, subframe configuration information, and pattern information on a unit resource, wherein the subframe configuration information comprises: subframe shift information and period information.

11. The device according to claim 10, wherein the measurement information further comprises:

a neighboring cell identity or identity information of a third communications node, wherein the third communications node is adjacent to the first communications node.

12. The device according to claim 10, wherein the measurement information further comprises:
a measurement signal type.

13. The device according to claim 12, wherein the measurement signal type comprises at least one of the following:
a CRS whole-set measurement, a CRS restricted measurement, a CSI-RS measurement, or a CRS and CSI-RS hybrid measurement.

14. The device according to claim 10, wherein the measurement information further comprises:
measurement type configuration information.

15. The device according to claim 10, wherein the measurement information further comprises:
report configuration information to indicate a manner of sending the measurement report by the second communications node.

16. The device according to claim 15, wherein the report configuration information further comprises:
a period value of reporting the measurement result by the second communications node from a bottom layer to a higher layer; or
a quantity value of measurement signals in the measurement result reported by the second communications node from a bottom layer to a higher layer.

\* \* \* \* \*